(12) United States Patent
Hu et al.

(10) Patent No.: US 11,980,817 B2
(45) Date of Patent: May 14, 2024

(54) VIRTUAL ROLE CONVERSION METHOD AND APPARATUS

(71) Applicant: TENCENT TECHNOLOGY (SHENZHEN) COMPANY LIMITED, Shenzhen (CN)

(72) Inventors: Jian Hu, Shenzhen (CN); Peixin Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 207 days.

(21) Appl. No.: 17/707,348

(22) Filed: Mar. 29, 2022

(65) Prior Publication Data

US 2022/0379218 A1 Dec. 1, 2022

Related U.S. Application Data

(63) Continuation of application No. PCT/CN2020/128723, filed on Nov. 13, 2020.

(30) Foreign Application Priority Data

Mar. 2, 2020 (CN) .......................... 202010136369.0

(51) Int. Cl.
 *A63F 13/58* (2014.01)
 *A63F 13/537* (2014.01)

(52) U.S. Cl.
 CPC ............ *A63F 13/58* (2014.09); *A63F 13/537* (2014.09)

(58) Field of Classification Search
 CPC ................................ A63F 13/58; A63F 13/537
 See application file for complete search history.

(56) References Cited

U.S. PATENT DOCUMENTS

| 2014/0106877 | A1 | 4/2014 | Knutsson et al. |
| 2015/0281157 | A1* | 10/2015 | Pearce .................. H04L 51/18 709/206 |

(Continued)

FOREIGN PATENT DOCUMENTS

| CN | 105498211 A | 4/2016 |
| CN | 109794065 A | 5/2019 |

(Continued)

OTHER PUBLICATIONS

Comicfire, Final Fantasy 1: Class Change, 2011, www.youtube.com, at https://www.youtube.com/watch?v=66UpX8LPn6w (last visited Dec. 20, 2023. (Year: 2011).*

(Continued)

*Primary Examiner* — Steve Rowland
(74) *Attorney, Agent, or Firm* — Crowell & Moring LLP

(57) ABSTRACT

This disclosure relates to a role conversion method and apparatus. The method may include displaying a virtual environment. A first virtual object and a second virtual object are being displayed in the virtual environment. The method may further include obtaining a role conversion instruction for the first virtual object and converting the first virtual object to a target virtual object having a same role as the second virtual object in response to the role conversion instruction. The method may further include assigning a role attribute the same as that of the second virtual object to the target virtual object.

22 Claims, 22 Drawing Sheets

(56) References Cited

U.S. PATENT DOCUMENTS

2016/0144278 A1* 5/2016 el Kaliouby ............ A63F 13/58
                                                                       463/36
2018/0071614 A1* 3/2018 Van Havermaet .. A63F 3/00075
2019/0262723 A1* 8/2019 Trombetta .............. A63F 13/79

FOREIGN PATENT DOCUMENTS

| CN | 109960558 A | 7/2019 |
|---|---|---|
| CN | 110215700 A | 9/2019 |
| CN | 110433488 A | 11/2019 |
| CN | 110465090 A | 11/2019 |
| CN | 110585709 A | 12/2019 |
| CN | 110681152 A | 1/2020 |
| CN | 111359211 A | 7/2020 |

OTHER PUBLICATIONS

International Search Report of PCT Application PCT/CN2020/128723 dated Jan. 26, 2021, 12 pages.
Office Action and Search Report of Chinese application 202010136369.0 dated Mar. 30, 2021, 9 pages.
Second Office Action of Chinese application 202010136369.0 dated Aug. 20, 2021, 8 pages.
CounterStrike Online, Jul. 29, 2019, PFD screenshot of game video. Http://v.qq.com/x/pagee08411)w8k8.html Feb. 24, 2019, PDF screenshot of game video.
Pokemon Let's Go Pikachu & Eevee Wi-Fi Battle: Ditto Proves Me Wrong! (1080p), https://www.youtube.com/watch?v=ALKad1XDV9o. 9:50-11:50.
GBA, https://www.youtube.com/watch?v=4dZlnhyis-Y. 3:45-3:54.

* cited by examiner

VIRTUAL ROLE CONVERSION METHOD AND APPARATUS

RELATED APPLICATION

This application is a continuation application of PCT Patent Application No. PCT/CN2020/128723, filed on Nov. 13, 2020, which claims priority to Chinese Patent Application No. 2020101363690, filed with the China National Intellectual Property Administration on Mar. 2, 2020, and entitled "ROLE CONVERSION METHOD AND APPARATUS, COMPUTER DEVICE, AND STORAGE MEDIUM", wherein the content of each of the above-referenced applications is incorporated herein by reference in its entirety

FIELD OF THE TECHNOLOGY

This application relates to the field of computer technologies, and in particular, to a role conversion method and apparatus, a computer device, and a storage medium.

BACKGROUND OF THE DISCLOSURE

In an interactive virtual scene, a user may control one or more virtual objects to interact with a virtual object controlled by an opposing party (for example, another user or a computer program). For example, the user controls a game role to attack a game role controlled by the opposing party, so as to achieve the purpose of upgrading. However, only the virtual object of the original role is controlled to interact with the virtual object of the opposing party, causing a certain limitation on an interaction effect.

SUMMARY

Embodiments of this disclosure provide a role conversion method and apparatus, a computer device, and a storage medium.

A role conversion method is provided, performed by a computer device. The method may include displaying a virtual environment. A first virtual object and a second virtual object are being displayed in the virtual environment. The method may further include obtaining a role conversion instruction for the first virtual object and converting the first virtual object to a target virtual object having a same role as the second virtual object in response to the role conversion instruction. The method may further include assigning a role attribute the same as that of the second virtual object to the target virtual object.

A role conversion apparatus is provided. The apparatus may include a memory operable to store computer-readable instructions and a processor circuitry operable to read the computer-readable instructions. When executing the computer-readable instructions, the processor circuitry may be configured to display a virtual environment. A first virtual object and a second virtual object are being displayed in the virtual environment. The processor circuitry may be further configured to obtain a role conversion instruction for the first virtual object and convert the first virtual object to a target virtual object having a same role as the second virtual object in response to the role conversion instruction. The processor circuitry may be further configured to assign a role attribute the same as that of the second virtual object to the target virtual object.

A non-volatile machine-readable storage medium having instructions stored thereon is provided. When the instructions are executed, the instructions may cause a machine to display a virtual environment. A first virtual object and a second virtual object are being displayed in the virtual environment. The instructions may further cause the machine to obtain a role conversion instruction for the first virtual object and convert the first virtual object to a target virtual object having a same role as the second virtual object in response to the role conversion instruction. The instructions may further cause the machine to assign a role attribute the same as that of the second virtual object to the target virtual object.

Details of one or more embodiments of this disclosure are provided in the subsequent accompanying drawings and descriptions. Other features and advantages of this disclosure become obvious with reference to the specification, the accompanying drawings, and the claims.

DESCRIPTION OF EMBODIMENTS

To make the objectives, technical solutions, and advantages of this disclosure clearer, the following further describes this disclosure in detail with reference to the accompanying drawings and the embodiments. It is to be understood that the specific embodiments described herein are only used for explaining this disclosure, and are not used for limiting this disclosure.

Figure 1:
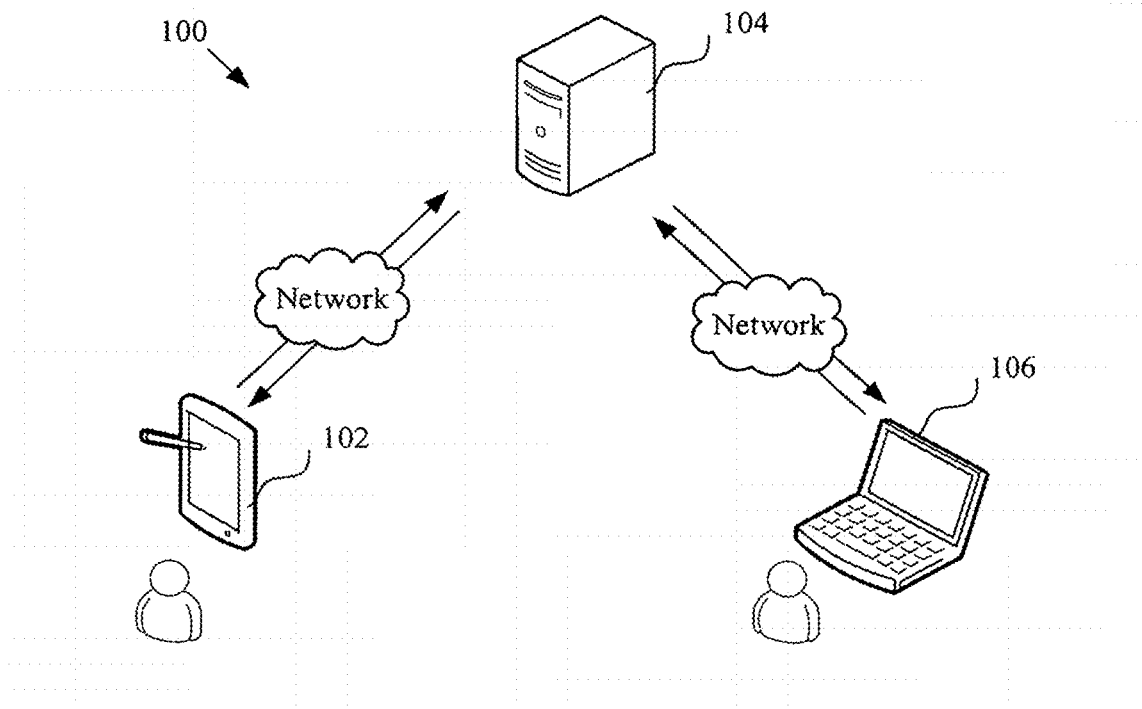
FIG. 1 is a diagram of an application environment of a role conversion method according to an embodiment.

A role conversion method provided by this disclosure is applicable to an application environment 100 shown in FIG. 1. A terminal 102, a server 104, and a terminal 106 may communicate with each other through a network. When a user 1 performs game interaction with an opposing party (for example, a computer program or a user 2), a first virtual object is controlled by the user 1, and a second virtual object may be controlled by the computer program or the user 2. The computer program may be installed on the terminal 1 or may be installed on the server 104. The user 1 displays a virtual environment by using the terminal 102, the first virtual object and the second virtual object being displayed in the virtual environment; obtains a role conversion instruction for the first virtual object; converts the first virtual object to a target virtual object having a same role as the second virtual object in response to the role conversion instruction; and assigns a role attribute the same as that of the second virtual object to the target virtual object.

The terminal 102 and the terminal 106 may be, but not limited to, a personal computer, a notebook computer, a smartphone, a tablet computer, and a portable wearable device. The server 104 may be implemented by an independent server or a server cluster including a plurality of servers.

Figure 2:
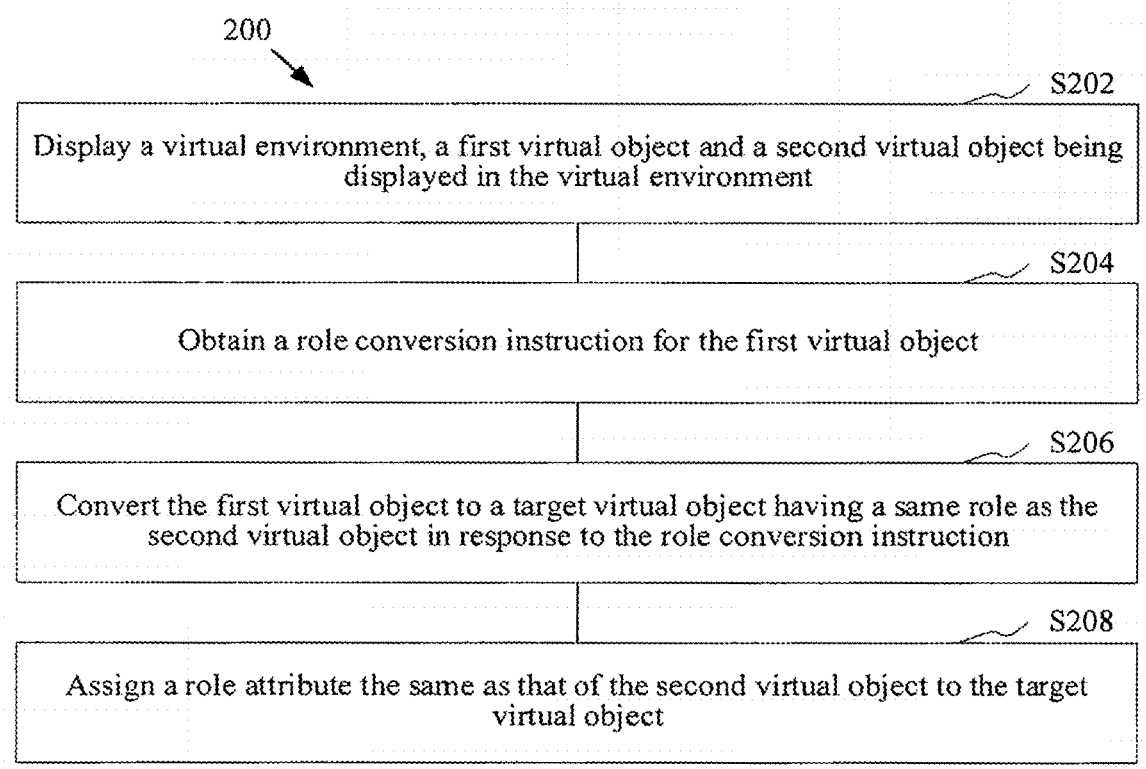
FIG. 2 is a schematic flowchart of a role conversion method according to an embodiment.

In an embodiment, as shown in FIG. 2, a role conversion method 200 is provided. For example, the method is applicable to the terminal 102 in FIG. 1 and includes the following steps.

S202. Display a virtual environment, a first virtual object and a second virtual object being displayed in the virtual environment.

Figure 3:
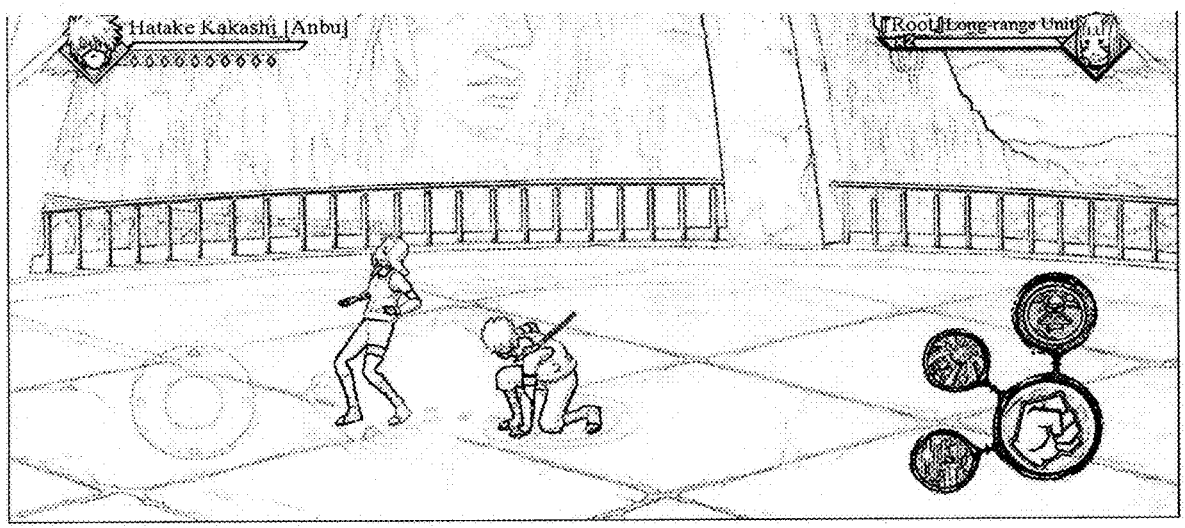
FIG. 3 is a schematic diagram in which a first virtual object attacks a second virtual object according to an embodiment.

The virtual environment is a virtual scene environment generated by using a computer. For example, the virtual environment may be a game scene. The virtual environment provides a multimedia virtual world, which may allow a user to use a control on an operation interface to control a virtual object or directly control an operable virtual object in the virtual environment, to observe an object, a character, scenery, and the like in the virtual environment from a viewing angle of the virtual object and use a virtual object to interact with another virtual object in the virtual environment. For example, as shown in FIG. 3, a user terminal operates a virtual character 1 (named as Hatake Kakashi) to attack a virtual character 2 (named as Long-range Unit).

The virtual environment is generally a two-dimensional or multi-dimensional virtual environment generated by an application program in a computer device such as a terminal and then displayed through hardware (for example, a screen) in the terminal. The terminal may be a mobile terminal such as a smartphone, a tablet computer, or an e-book reader. Alternatively, the terminal may be a personal computer device such as a notebook computer or a fixed computer.

The first virtual object may be a movable virtual object operated by a user in the virtual environment. The second virtual object may be a movable virtual object operated by an opposing party (for example, a computer program or another user) in the virtual environment or may be an unmovable virtual item in the virtual environment. The movable object may be a virtual character, a virtual animal, an animation and cartoon character, or the like. The virtual item may be a virtual cap, a virtual decoration, a virtual chair, a virtual box, a virtual barrel, or the like. Each virtual object has a shape and a volume in the virtual environment, and occupies some space in the virtual environment.

In an embodiment, a terminal obtains position information of a first virtual object, determines to-be-obtained virtual environment data according to the position information, renders the virtual environment data to obtain a virtual environment that needs to be displayed, and then displays the virtual environment on a user interface in a form of image. When the position information of the first virtual object is changed, a corresponding part of virtual environment data is obtained according to changed position information, the corresponding part of virtual environment data is rendered to obtain a new virtual environment, and then the currently displayed virtual environment is updated by using the new virtual environment. The newly obtained virtual environment data may be data of a virtual environment to be displayed on the terminal when the position changes. In addition, the newly obtained virtual environment data may alternatively include a part of data of a virtual environment that has been display on the terminal and data of a virtual environment to be displayed on the terminal when the position is changed.

In an embodiment, when the virtual environment data is obtained, on one hand, the terminal obtains virtual object data of a user, renders the virtual object data to obtain a first virtual object that can be displayed, and displays the first virtual object in the virtual environment when displaying the virtual environment. The first virtual object is a first virtual character.

On the other hand, when a second virtual object is a virtual character belonging to an opposing camp (that is, an enemy camp), the terminal determines a task level of the user, obtains virtual object data of the enemy camp according to the task level, then renders the virtual object data to obtain the second virtual object that can be displayed, and displays the second virtual object in the virtual environment when displaying the virtual environment.

In an embodiment, when the second virtual object is the virtual character belonging to the enemy camp, during interaction, the terminal further determines whether a second virtual object needs to be newly added according to a quantity of second virtual objects in the virtual environment or a task process of a first virtual object in a corresponding level. If the quantity of second virtual objects in the virtual environment is less than a preset quantity or the task process of the first virtual object in the corresponding level meets a newly added condition, the second virtual object is newly added to the displayed virtual environment. The second virtual object may be at least one virtual object in the corresponding level in the enemy camp, and in the same level, there may be second virtual objects of different types in the enemy camp. In different levels, types of virtual objects in levels in the enemy camp may be different, and corresponding health points, combat powers, and anti-attack values may also be different.

In another embodiment, when the second virtual object is a virtual item, corresponding item data is obtained according to the position information of the first virtual object, the item data is rendered to obtain a virtual item that can be displayed, and the virtual item is displayed in the virtual environment.

S204. Obtain a role conversion instruction for the first virtual object.

Role conversion refers to that roles may be converted between different virtual objects. Correspondingly, the role conversion instruction is an instruction for converting the first virtual object to a same role as the second virtual object. For example, the first virtual object may be converted to a target virtual object the same as the second virtual object. Because the second virtual object may be the virtual character or may be the virtual item, the first virtual object may be converted to a virtual character of a corresponding role or may be converted to a corresponding virtual item.

In an embodiment, before S204, the terminal may determine a distance between the first virtual object and the second virtual object, obtain the role conversion instruction for the first virtual object when the distance is less than a preset distance, and then perform S206, so that role conversion can be automatically performed on the first virtual object controlled by the user, thereby improving the convenience and the conversion efficiency of the role conversion. Alternatively, the terminal determines whether the first virtual object catches or touches the second virtual object, obtains the role conversion instruction for the first virtual object when the first virtual object catches or touches the second virtual object, and then performs S206. On one hand, automatic role conversion can be implemented. On the other hand, it may be avoided that it cannot be determined that the first virtual object is converted to which type of second virtual object due to a large quantity of second virtual objects of different types around the first virtual object, which is beneficial to cause a target of role conversion more accurate.

In an embodiment, when the user triggers a role conversion button on a user interface or performs another operation (for example, double clicking/tapping or long pressing the second virtual object) meeting the role conversion, the terminal generates the role conversion instruction used for converting the first virtual object to the same role as the second virtual object.

S206. Convert the first virtual object to a target virtual object having a same role as the second virtual object in response to the role conversion instruction.

In an embodiment, after the terminal converts the first virtual object to a target virtual object, a health point and an action point of the first virtual object will continue to be used as a health point and an action point of the target virtual object. For example, the first virtual object originally has a health point 100 and an action point 200, and after the first virtual object is converted to the target virtual object, the target virtual object also has the health point 100 and the action point 200. Therefore, the health point, a motion ability, and an attack strength of the target virtual object are all the same as that of the first virtual object before the conversion.

In an embodiment, S206 may specifically include: determining, by the terminal, a posture corresponding to the first virtual object during role conversion when the second virtual object is a virtual character belonging to an enemy camp, obtaining, according to the second virtual object, corresponding virtual object data matching the posture, and performing image rendering on the virtual object data, to obtain the target virtual object having the same role as the second virtual object and appearing as the posture. Subsequently, the terminal replaces the first virtual object with the target virtual object at a corresponding position (for example, a position of the first virtual object) in the virtual environment. During replacement, a corresponding replacement effect may be displayed. The replacement effect may be a specific text or translucent virtual smog.

In an embodiment, S206 may specifically include: obtaining, by the terminal, skeleton data and corresponding costume data of the second virtual object when the second virtual object is the virtual character belonging to the enemy camp; and generating the target virtual object according to the skeleton data and the costume data of the second virtual object. The skeleton data of the second virtual object is pre-stored, and the target virtual object is generated according to the skeleton data and the costume data, thereby improving a speed and an effect of the role conversion. In addition, in the virtual environment, the first virtual object is replaced with the target virtual object, and during replacement, a corresponding replacement effect may be displayed, to improve a visual effect of the user and the user stickiness.

In an embodiment, the terminal determines a posture corresponding to the first virtual object during role conversion, obtains skeleton data and costume data of the first virtual object corresponding to the posture, and performs image rendering on the skeleton data and the costume data of the first virtual object, to generate a target virtual object having the posture. During role conversion, a posture of a role before conversion may be recorded, so that during conversion into the target virtual object, the posture before the conversion can be still maintained, to keep visual continuity before and after role conversion, thereby improving user experience.

In an embodiment, when the second virtual object is a virtual item, the terminal obtains virtual object data according to the second virtual object, performs image rendering according to the virtual object data, to obtain a target virtual object (that is, a target virtual item, determines a position of the target virtual object to be displayed in the virtual environment, and replaces the first virtual object with the target virtual object and displays the target virtual object in the virtual environment according to the position. During replacement, a corresponding replacement effect may be displayed.

S208. Assign a role attribute the same as that of the second virtual object to the target virtual object.

The role attribute may be an attribute possessed by a virtual object. When the second virtual object is the virtual character belonging to the enemy camp, the role attribute may be a skill attribute assigned to the target virtual object and also possessed by the second virtual object, and specifically may be an attack skill used for attacking, a defense skill used for defending, or the like. When the second virtual object is the virtual item, the role attribute may be an attribute possessed by an item, for example, a reflection capability, an odor (for example, an odor formed by releasing gas), a color changing capability, and a corresponding damage capability when the virtual item is used for attacking (for example, releasing toxic gas) possessed by the virtual item.

In an embodiment, when the second virtual object belongs to a character type in the enemy camp, the terminal assigns a role attribute the same as that of the second virtual object and used for attacking the second virtual object to the target virtual object. When the second virtual object is an item (for example, a thing) in the virtual environment, the terminal assigns a role attribute the same as that of the second virtual object to the target virtual object. The role attribute may be an attribute used for hiding or attacking, for example, an attribute in which a color changes over time or an attribute in which toxic gas may be emitted.

In an embodiment, S208 may specifically include: obtaining, by the terminal, a role attribute resource file having a mapping relationship with the second virtual object; and establishing a mapping relationship between the target virtual object and the role attribute resource file, so that the target virtual object has the role attribute the same as that of the second virtual object and used for interaction. A skill attribute of the second virtual object and the role attribute resource file are mapped, so that when a first virtual object controlled by the user is converted to a target virtual object matching a second virtual object in an opposing camp, a mapped role attribute resource file may be efficiently found, and a skill attribute the same as that of the second virtual object is assigned to the target virtual object by using the role attribute resource file, which is beneficial to quickly owning a corresponding skill attribute after the role conversion.

In an embodiment, when the second virtual object is the virtual character belonging to the enemy camp, second virtual objects of different types have different skill attributes, and correspondingly, a mapping relationship exists between the second virtual objects of different types and different role attribute resource files. The terminal obtains a role attribute resource file having a mapping relationship with a corresponding second virtual object from a database, and establishes a mapping relationship between a target virtual object and the role attribute resource file, so that the target virtual object has a skill attribute the same as that of the second virtual object and used for interaction. The terminal uses an attack skill in the skill attribute to attack the second virtual object or uses a defense skill in the skill attribute to defend against an attack of the second virtual object.

In an embodiment, the terminal may cut off a mapping relationship between the target virtual object and an original role attribute resource file, so that the target virtual object does not have a skill attribute originally possessed by the first virtual object. Alternatively, the terminal may continuously maintain a mapping relationship between the target virtual object and an original role attribute resource file, so that the target virtual object has a skill attribute originally possessed by the first virtual object and also has the skill attribute the same as that of the second virtual object and used for interaction.

In an embodiment, when the second virtual object is the virtual item, second virtual objects of different types have different item attributes, and correspondingly, a mapping relationship exists between the second virtual objects of different types and different role attribute resource files. The terminal obtains a role attribute resource file having a mapping relationship with a corresponding second virtual object from a database, and establishes a mapping relationship between a target virtual object and the role attribute resource file, so that the target virtual object has an item attribute the same as that of the second virtual object. Because the first virtual object is displayed in the virtual environment in a form of virtual item and also has the item attribute the same as that of the second virtual object, the first virtual object may be hidden in the virtual environment in the form of virtual item and cannot be found by a virtual object in the enemy camp.

In the embodiments, in a virtual environment, a user may perform role conversion on a first virtual object, to convert the first virtual object to a target virtual object having a same role as a second virtual object and may obtain a role attribute the same as that of the second virtual object, so that the user may not only use a role attribute of the first virtual object to interact with the second virtual object, but also use the role attribute the same as that of the second virtual object to interact with the second virtual object, to greatly improve an interaction effect.

The second virtual object may be the virtual character belonging to the enemy camp or may be the virtual item. Therefore, role conversion on the first virtual object is described by using the following scenarios:

Scenario 1. A second virtual object is a virtual character belonging to an enemy camp, and the role conversion method is applicable to a clearance task (for example, a clearance battle game).

Figure 4:
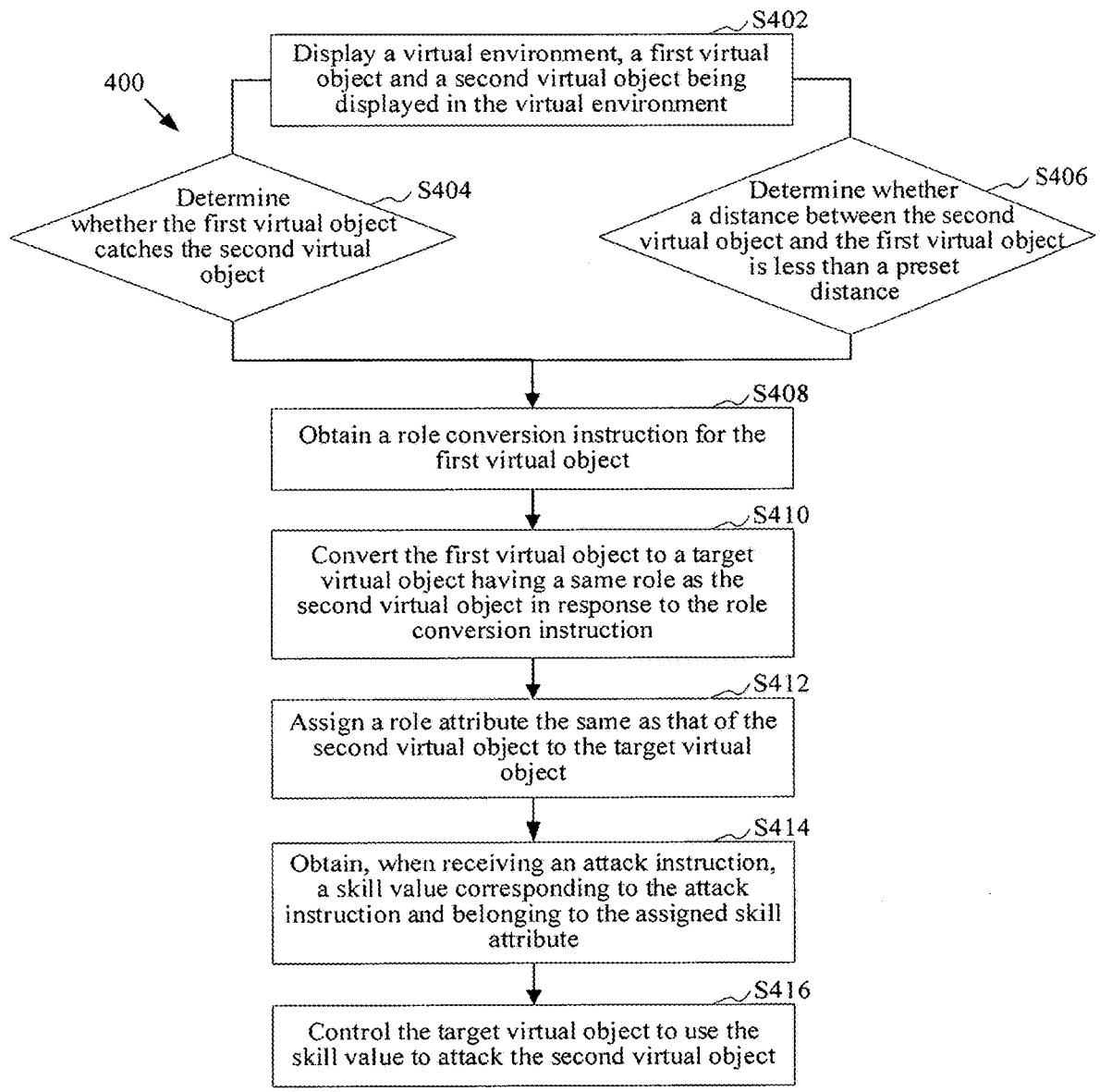
FIG. 4 is a schematic flowchart of a role conversion method according to another embodiment.

As shown in FIG. 4, the role conversion method 400 includes the following steps.

S402. Display a virtual environment, a first virtual object and a second virtual object being displayed in the virtual environment.

In an embodiment, before S402, the terminal displays a role selection page, at least two candidate roles being displayed in the role selection page; receives a selection instruction input; selects, according to the selection instruction, a role of which an attack capability is to be strengthened from the candidate roles; and uses the role of which the attack capability is to be strengthened as the first virtual object displayed in the virtual environment. Through selection of a role, on one hand, a problem that the first virtual object controlled by the user is weak in some specific skills may be avoided, on the other hand, the first virtual object controlled by the user can strengthen a to-be-strengthened attack capability by role conversion, to enhance the attack capability.

Different candidate roles have different skills. For example, a close-range strengthened role may have a relatively weak long-range attack capability, that is, the role is a role of which the long-range attack capability is to be strengthened. For a long-range strengthened role, the rest may be deduced by analogy.

S404. Determine whether the first virtual object catches the second virtual object, perform S408 if the first virtual object catches the second virtual object, and detect a catching action of the first virtual object in real time if the first virtual object does not catch the second virtual object.

The first virtual object is a role with a to-be-strengthened attack capability, for example, a role with a to-be-strengthened long-range attack capability, a to-be-strengthened close-range attack capability, a to-be-strengthened medical skill, or a to-be-strengthened magic capability. Correspondingly, there may be a plurality of second virtual objects, each second virtual object may be a virtual object of the same type or different types, and each second virtual object has a role with a strengthened attack capability, for example, a role with a strengthened long-range attack capability, a strengthened close-range attack capability, a strengthened medical skill, or a strengthened magic capability.

In an embodiment, to cause the first virtual object controlled by the user to be converted to a role with a stronger attack capability, the terminal selects a second virtual object with a strengthened attack capability from at least two second virtual objects, determines whether the first virtual object catches the second virtual object with the strengthened attack capability, and then performs S408 to perform role conversion. When the first virtual object is converted to a target virtual object the same as the second virtual object with the strengthened attack capability, the converted target virtual object will strengthen a weak attack capability, for example, strengthen a long-range attack capability, or a close-range attack capability, a medical skill, or a magic capability, to improve the attack capability of the first virtual object controlled by the user.

In an embodiment, the terminal further controls the first virtual object to use a skill value in the skill attribute of the first virtual object to attack the second virtual object before and after selecting the second virtual object.

S406. Determine whether a distance between the second virtual object and the first virtual object is less than a preset distance, perform S408 if the distance is less than the preset distance, and continuously detect moving coordinates of the first virtual object if the distance is not less than the preset distance.

In an embodiment, the terminal detects position coordinates of the first virtual object during movement and position coordinates of the second virtual object during movement in real time, calculates a distance between the second virtual object and the first virtual object according to the two position coordinates, and then determines whether the distance between the second virtual object and the first virtual object is less than a preset distance.

In an embodiment, the terminal further controls the first virtual object to use the skill value in the skill attribute of the first virtual object to attack the second virtual object during movement of the first virtual object.

S408. Obtain a role conversion instruction for the first virtual object.

In an embodiment, when the user triggers a role conversion button on a user interface or performs another operation (for example, double clicking/tapping or long pressing the second virtual object) meeting the role conversion, the terminal generates the role conversion instruction used for converting the first virtual object to the same role as the second virtual object. When the condition in S404 or S406 is met, the role conversion instruction used for converting the first virtual object to a role the same as that of the second virtual object is obtained.

In an embodiment, before S408, the terminal marks the caught second virtual object or the second virtual object within a preset distance range, to determine that role conversion is performed according to the marked second virtual object during role conversion. A specific mark is added to the second virtual object, to ensure that the marked second virtual object is a role just caught or a role within the preset distance range and avoid a role conversion error during role conversion.

S410. Convert the first virtual object to a target virtual object having a same role as the second virtual object in response to the role conversion instruction.

In an embodiment, after the terminal converts the first virtual object to a target virtual object, a health point and an action point of the first virtual object will continue to be used as a health point and an action point of the target virtual object. For example, the first virtual object originally has a health point 100 and an action point 200, and after the first virtual object is converted to the target virtual object, the target virtual object also has the health point 100 and the action point 200. Therefore, the health point, a motion ability, and an attack strength of the target virtual object are all the same as that of the first virtual object before the conversion.

In an embodiment, S410 may specifically include: determining, by the terminal, a posture corresponding to the first virtual object during role conversion, obtaining, according to the second virtual object, corresponding virtual object data matching the posture, and performing image rendering on the virtual object data, to obtain the target virtual object having the same role as the second virtual object and appearing as the posture. Subsequently, the terminal replaces the first virtual object with the target virtual object at a corresponding position (for example, a position of the first virtual object) in the virtual environment. During replacement, a corresponding replacement effect may be displayed. The replacement effect may be a specific text or translucent virtual smog.

In an embodiment, S410 may specifically include: obtaining, by the terminal, skeleton data and corresponding costume data of the second virtual object when the second virtual object is a virtual character belonging to an enemy camp; and generating the first virtual object according to the skeleton data and the costume data of the first virtual object; and replacing the first virtual object with the target virtual object in the virtual environment. During replacement, a corresponding replacement effect may be displayed.

In an embodiment, the terminal determines a posture corresponding to the first virtual object during role conversion, obtains skeleton data and costume data of the first virtual object corresponding to the posture, and performs image rendering on the skeleton data and the costume data of the first virtual object, to generate a target virtual object having the posture.

In an embodiment, S410 may specifically include: determining, by the terminal, whether a health point of the second virtual object reaches a conversion condition; and converting the first virtual object to the target virtual object having the same role as the second virtual object when the health point of the second virtual object reaches the conversion condition.

For example, the terminal determines whether the health point of the second virtual object is 0, and converts the first virtual object to the target virtual object having the same role as the second virtual object if the health point is 0. If the health point is not 0, the terminal may continuously control the target virtual object to attack the second virtual object according to an attack operation of the user until the health point of the second virtual object is 0.

In an embodiment, when the health point of the second virtual object does not reach the conversion condition, the terminal displays prompt information indicating that the role conversion fails at a picture level of the virtual environment picture; and controls the first virtual object to vibrate. In addition, a vibration voice prompt may be sent. Through displaying of the prompt information and vibration of a virtual object, failure of the role conversion and a reason for the failure may be prompted to the user, which helps the user improve a success rate of the conversion during subsequent role conversion.

For example, if the health point of the second virtual object is not 0, the terminal displays a text prompt indicating that the role conversion fails at the picture level of the virtual environment, and moreover, further controls the first virtual object to vibrate.

S412. Assign a role attribute the same as that of the second virtual object to the target virtual object.

In an embodiment, the terminal assigns a role attribute the same as that of the second virtual object and used for interaction to the target virtual object.

Because the second virtual object is the virtual character belonging to the enemy camp, the role attribute may be a skill attribute assigned to the target virtual object and also possessed by the second virtual object, and specifically may be an attack skill used for attacking, a defense skill used for defending, or the like.

In an embodiment, S412 may specifically include: obtaining, by the terminal, a role attribute resource file having a mapping relationship with the second virtual object; and establishing a mapping relationship between the target virtual object and the role attribute resource file, so that the target virtual object has the role attribute the same as that of the second virtual object and used for interaction.

In an embodiment, when the second virtual object is the virtual character belonging to the enemy camp, second virtual objects of different types have different skill attributes, and correspondingly, a mapping relationship exists between the second virtual objects of different types and different role attribute resource files. The terminal obtains a role attribute resource file having a mapping relationship with a corresponding second virtual object from a database, and establishes a mapping relationship between a target virtual object and the role attribute resource file, so that the target virtual object has a skill attribute the same as that of the second virtual object and used for interaction.

In an embodiment, the terminal may cut off a mapping relationship between the target virtual object and an original role attribute resource file, so that the target virtual object does not have a skill attribute originally possessed by the first virtual object. Alternatively, the terminal may continuously maintain a mapping relationship between the target virtual object and an original role attribute resource file, so that the target virtual object has a skill attribute originally possessed by the first virtual object and also has the skill attribute the same as that of the second virtual object and used for interaction.

S414. Obtain, when an attack instruction is received, a skill value corresponding to the attack instruction and belonging to the assigned skill attribute.

In an embodiment, when a long-range attack instruction is received, the terminal obtains a long-range skill value (for example, a fire or thunder attack capability) corresponding to the long-range attack instruction and belonging to the assigned skill attribute. In an embodiment, when a close-range attack instruction is received, the terminal obtains a close-range skill value (for example, a swordplay or sabreplay attack capability) corresponding to the close-range attack instruction and belonging to the assigned skill attribute.

S416. Control the target virtual object to use the skill value to attack the second virtual object.

In an embodiment, when a long-range skill value is obtained, the target virtual object is controlled to use the long-range skill value to perform a long-range attack on the second virtual object. When a close-range skill value is obtained, the target virtual object is controlled to use the close-range skill value to perform a close-range attack on the second virtual object.

In an embodiment, in addition to attacking the second virtual object, the terminal may further use a defense skill value in the assigned skill attribute to defend against an attack of the second virtual object.

In an embodiment, the terminal may further heal the target virtual object by using a medical skill value in the assigned skill attribute when the target virtual object is injured by the attack of the second virtual object, to improve the health point and the action point of the target virtual object.

In an embodiment, to prevent the first virtual object controlled by the user from being always a role in the opposing camp, the first virtual object may be restored when meeting a corresponding condition. After S416, the method further includes: performing, by the terminal, role conversion on the target virtual object when the health point of the second virtual object reaches a restoration condition or a role restoration instruction is received, so that the target virtual object is restored to the first virtual object. Therefore, the user can restore the role to the original first virtual object while ensuring victory.

In an embodiment, when controlling the target virtual object to attack the second virtual object according to an operation inputted by the user, the terminal calculates a remaining health point of the second virtual object in real time, and performs role conversion on the target virtual object when the health point of the second virtual object reaches a restoration condition (for example, the health point is 0), so that the target virtual object is restored to the first virtual object. Alternatively, when the user wants to transform back during the attack or at a time point after the second virtual object is killed, a role restoration operation is performed on a user interface to generate a role restoration instruction. In this case, the terminal performs role conversion on the target virtual object, so that the target virtual object is restored to the first virtual object.

In an embodiment, the performing role conversion on the target virtual object, so that the target virtual object is restored to the first virtual object may specifically include: obtaining, by the terminal, skeleton data and corresponding costume data of the first virtual object; generating the first virtual object according to the skeleton data and the costume data of the first virtual object; and replacing the target virtual object with the first virtual object in the virtual environment.

In an embodiment, when the health point of the second virtual object reaches a restoration condition or a role restoration instruction is received, the terminal obtains skeleton data and corresponding costume data of the first virtual object; generates the first virtual object according to the skeleton data and the costume data of the first virtual object. The skeleton data of the first virtual object is pre-stored, and the original first virtual object is restored according to the skeleton data and the costume data, thereby improving a speed and an effect of the role conversion. In addition, in the virtual environment, the target virtual object is replaced with the first virtual object, and during replacement, a corresponding replacement effect may be displayed, to improve a visual effect of the user and the user stickiness.

In an embodiment, the terminal determines a current posture of the target virtual object, obtains skeleton data and costume data of the first virtual object corresponding to the posture, and performs image rendering on the skeleton data and the costume data of the first virtual object, to generate the first virtual object having the posture. During role restoration, a posture of a role before restoration may be recorded, so that during restoration into the original first virtual object, the posture before the restoration can be still maintained, to keep visual continuity before and after role restoration, thereby improving user experience.

In another embodiment, the terminal determines a current posture of the target virtual object, obtains, according to the first virtual object, corresponding virtual object data matching the posture, and performs image rendering on the virtual object data, to obtain the restored first virtual object. Subsequently, the terminal replaces the target virtual object with the first virtual object at a corresponding position (for example, a position of the target virtual object) in the virtual environment. During replacement, a corresponding replacement effect may be displayed, to improve a visual effect of the user and the user stickiness. The replacement effect may be a specific text or translucent virtual smog.

In an embodiment, before the operation of performing role conversion on the target virtual object or during conversion, the terminal cancels the skill attribute assigned to the target virtual object and consistent with that of the second virtual object, to prevent the first virtual object from reserving the skill attribute the same as that of the second virtual object in the opposing camp after the target virtual object is restored to the first virtual object. After the operation of performing role conversion on the target virtual object, the terminal assigns an originally possessed skill attribute to the restored first virtual object, so that the skill attribute of the first virtual object is restored to the initial skill attribute.

In an embodiment, after the first virtual object is restored, the terminal may further cancel the skill attribute of the restored first virtual object and consistent with that of the second virtual object. After an original role is restored, an possessed skill attribute of an opposing camp before restoration is canceled, which can avoid always owning the skill attribute of the opposing camp, so that the overuse of the skill attribute is avoided.

In an embodiment, the operation of canceling the skill attribute assigned to the target virtual object and consistent with that of the second virtual object may specifically include: canceling, by the terminal, the mapping relationship between the target virtual object and the role attribute resource file (the role attribute resource file causes the target virtual object to have the skill attribute the same as that of the second virtual object).

In an embodiment, the operation of assigning an originally possessed skill attribute to the restored first virtual object may specifically include: obtaining, by the terminal, a role attribute resource file having a mapping relationship with the first virtual object; and establishing the mapping relationship between the first virtual object and a role attribute resource file, so that the first virtual object has the original skill attribute. A skill attribute of the first virtual object and the role attribute resource file are mapped, so that when a role of an opposing camp is restored to the first virtual object, a mapped role attribute resource file may be efficiently found, and the original skill attribute is restored by using the role attribute resource file, to avoid loss of the skill attribute after role restoration.

Figure 5:
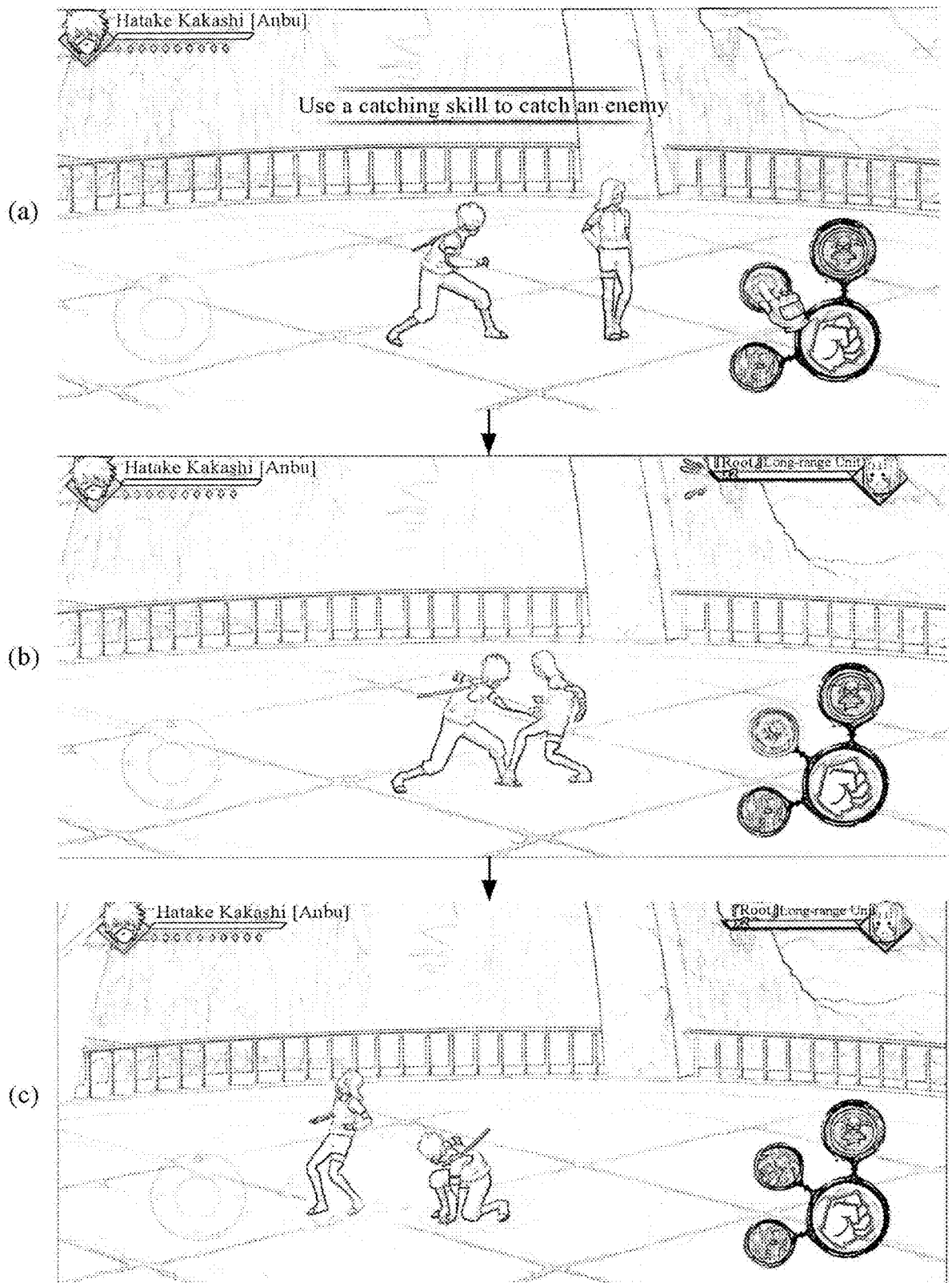
FIG. 5 is a schematic diagram in which a main character controlled by a user catches an enemy character according to an embodiment.
Figure 6:
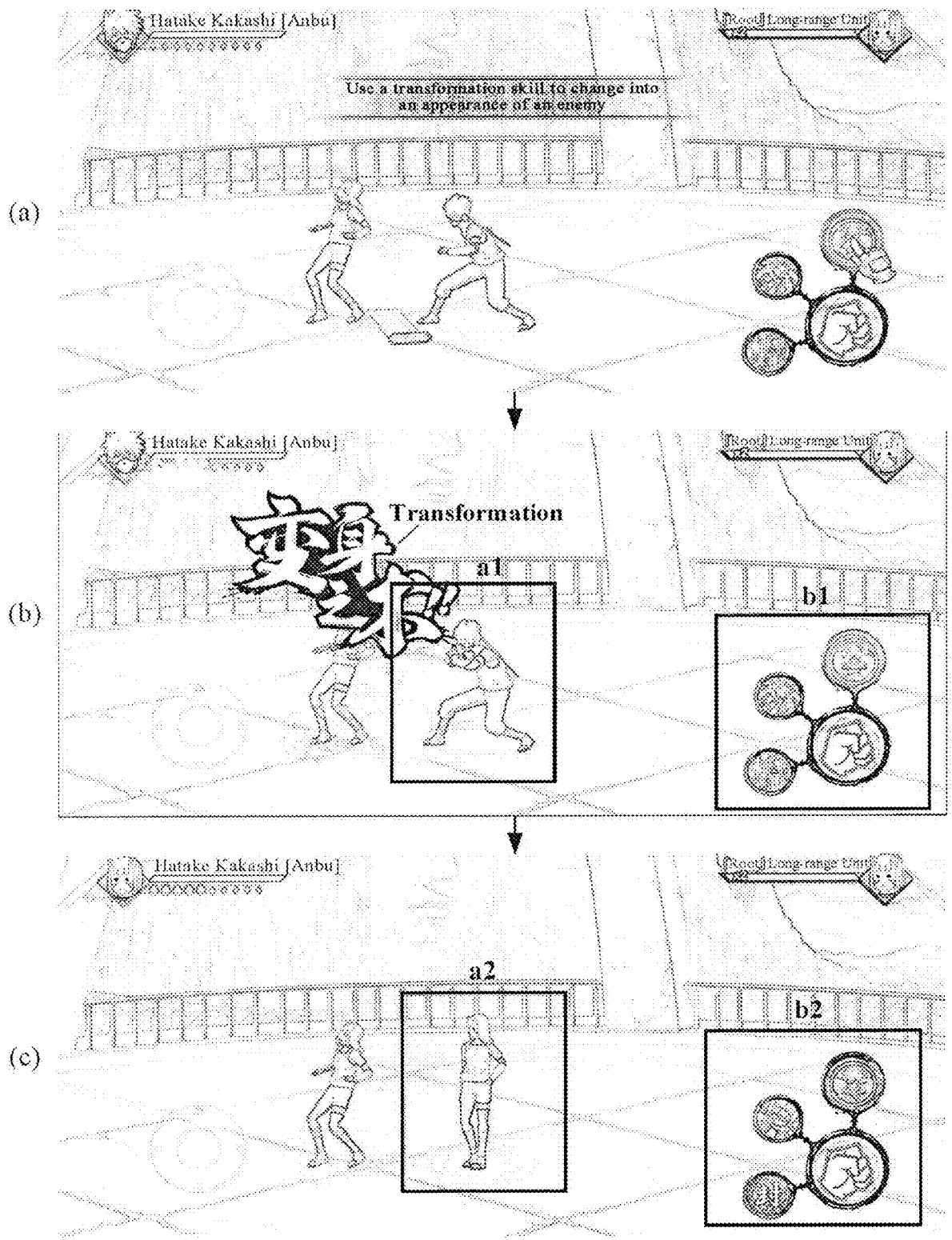
FIG. 6 is a schematic diagram in which a main character controlled by a user performs transformation according to an embodiment.
Figure 7:
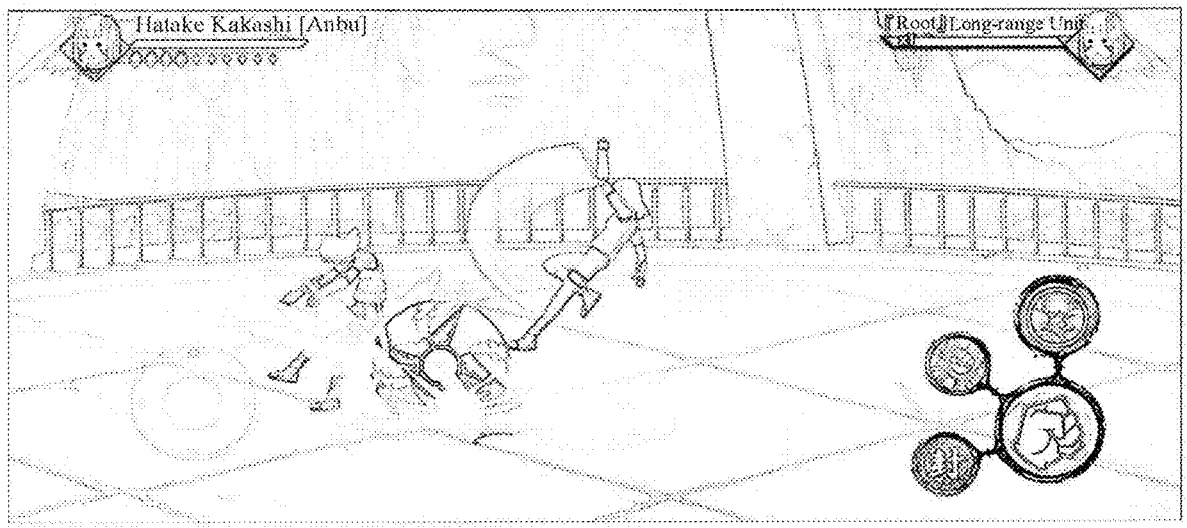
FIG. 7 is a schematic diagram in which a user controls a main character to use a skill the same as that of an enemy character to attack the enemy character according to an embodiment.
Figure 8:
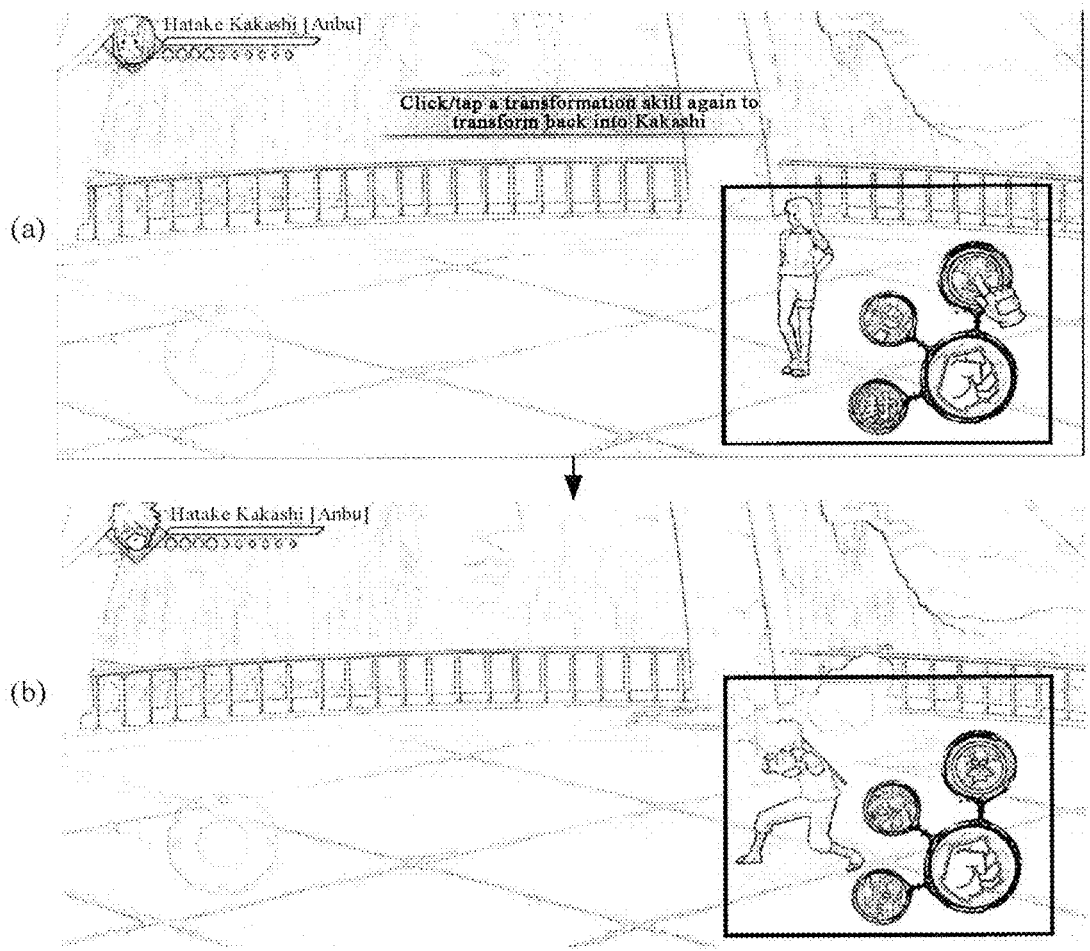
FIG. 8 is a schematic diagram of transforming back to a main character according to an embodiment.
Figure 9:
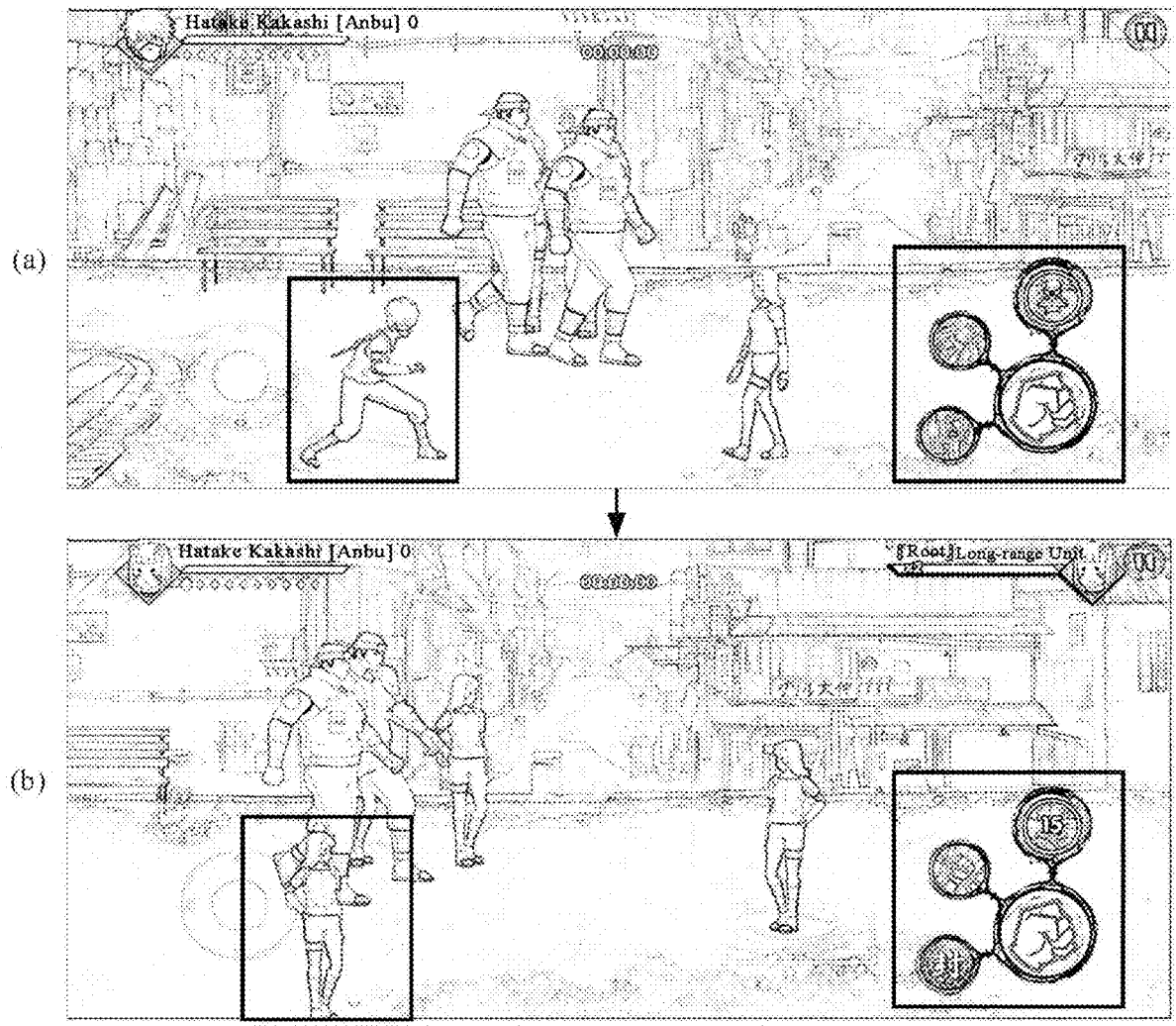
FIG. 9 is a schematic diagram of transforming a main character into another different enemy role according to an embodiment.

As an example, as shown in FIG. 5 to FIG. 9, FIG. 5 is a schematic diagram in which a main character (that is, Hatake Kakashi in the figure is a first virtual object) controlled by a user catches an enemy character (an inputted second virtual object), FIG. 6 is a schematic diagram in which a main character controlled by a user performs transformation, FIG. 7 is a schematic diagram in which a user controls a main character to use a skill the same as that of an enemy character to attack the enemy character, FIG. 8 is a schematic diagram of transforming back into a main character, and FIG. 9 is a schematic diagram in which a main character has been transformed into another different enemy role. Currently, FIG. 5 to FIG. 8 are respectively described.

Referring to FIG. 5, before performing role conversion, a user may select a catching button in the lower right corner of FIG. 5(*a*), to control a main character to catch an enemy character, where the schematic diagram of catching is shown in FIG. 5(*b*), and then throw the enemy character away to lock the enemy character, as shown in FIG. 5(*c*).

Referring to FIG. 6, when the user selects a transformation button in the lower right corner of FIG. 6(*a*), a transformation is started, as shown in FIG. 6 (*b*). Subsequently, the main character is converted to the enemy character through a transformation, that is, Hatake Kakashi is converted to a role the same as that of Long-range Unit. In this case, both an image and a skill of the transformed Hatake Kakashi are changed, which refer to Hatake Kakashi (before transformation) framed by a black box a1 and a skill (before transformation) framed by a black box b1 in FIG. 6 (*b*) and Hatake Kakashi (after transformation) framed by a black box a2 and a skill (after transformation) framed by a black box b2 in FIG. 6 (*c*).

Referring to FIG. 7, after the transformation is completed, the user may use a skill the same as that of the enemy character to attack the enemy character, that is, the transformed Hatake Kakashi uses a skill the same as that of the Long-range unit to attack the Long-range unit.

Referring to FIG. 8, after the enemy character is killed, the user transforms the transformed main character back into the original main character by using a transformation skill in the lower right corner of FIG. 8(*a*), that is, Hatake Kakashi of which the image is the Long-range unit is transformed back into the original Hatake Kakashi, as shown in FIG. 8 (*b*), and the image and the skill of Hatake Kakashi that is transformed into an original appearance are also changed, as shown in a black box in the figure.

Referring to FIG. 9, in a player VS environment (PVE), that is, in a game, a user challenges enemy characters such as non-player character (NPC) monster and BOSS (that is, a final big monster at each level) that are controlled by a computer program, the user may transform a main character (that is, Hatake Kakashi) into another different enemy role according to a situation on the field, and the main character may use another skill to fight against an enemy character (for example, Long-range unit).

Figure 10:
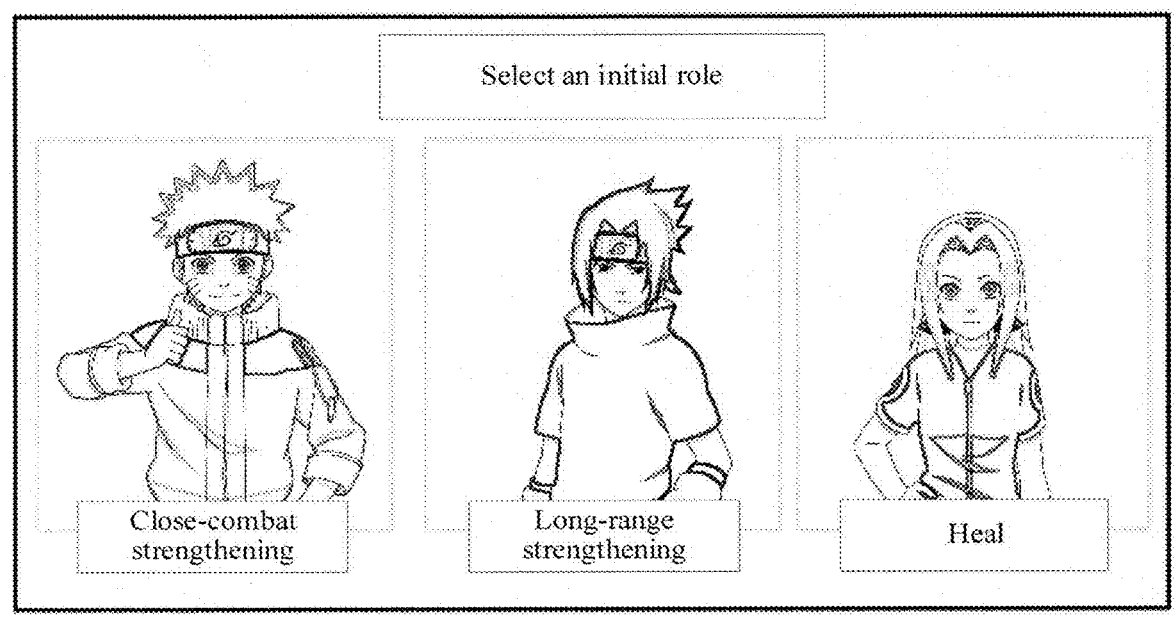
FIG. 10 is a schematic diagram in which a user selects a main character before a game is started according to an embodiment.
Figure 11:
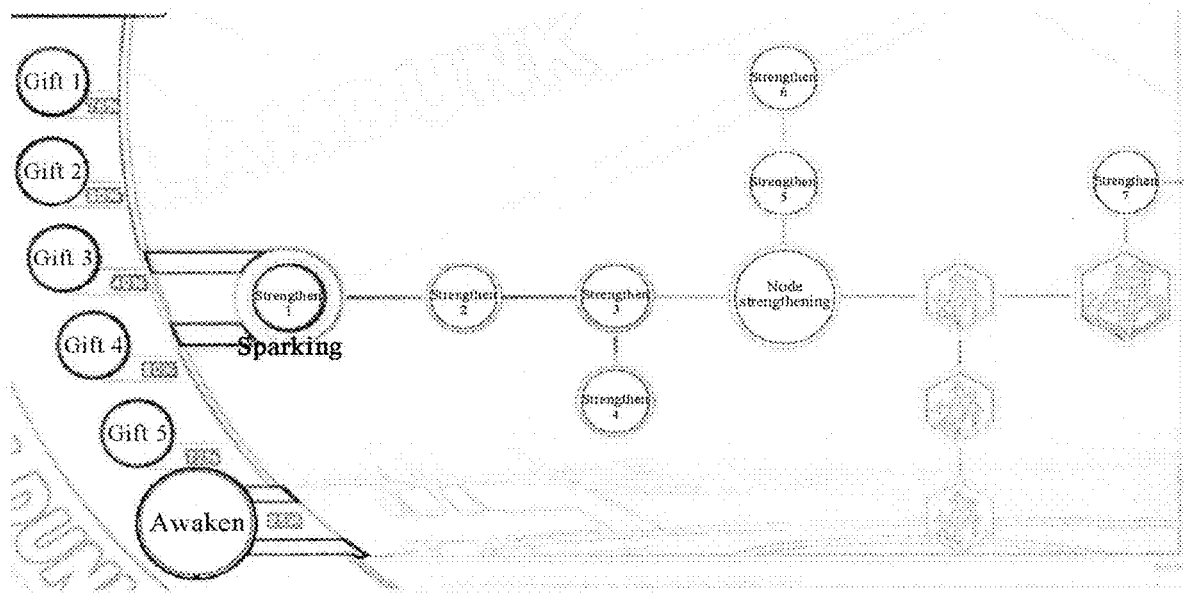
FIG. 11 is a schematic diagram of gifts and strengthened branches attached to main characters of different types according to an embodiment.

As another example, as shown in FIG. 10 and FIG. 11, FIG. 10 is a schematic diagram in which a user selects a main character before a game is started, and FIG. 11 is a schematic diagram of gifts and strengthened branches attached to main characters of different types. FIG. 10 and FIG. 11 are described below.

Referring to FIG. 10, before starting a game, the user selects a proper main character from candidate characters according to basic characteristics of different candidate characters and a basic characteristic of an enemy task of each level. For example, a main character is selected from a close-range (that is, melee) strengthened candidate character, a long-range strengthened candidate character, and a candidate character with a heal capability.

Referring to FIG. 11, after one candidate character is selected as a main character, a gift value and a skill that can be strengthened at each level or node of the main character are displayed.

As another example, during transformation of the main character, an image and a skill of the main character are required to be changed completely, but a part of data such as a walking speed and an attack force is not changed, which requires a complete separation between a representation and data of the main character.

Figure 12:
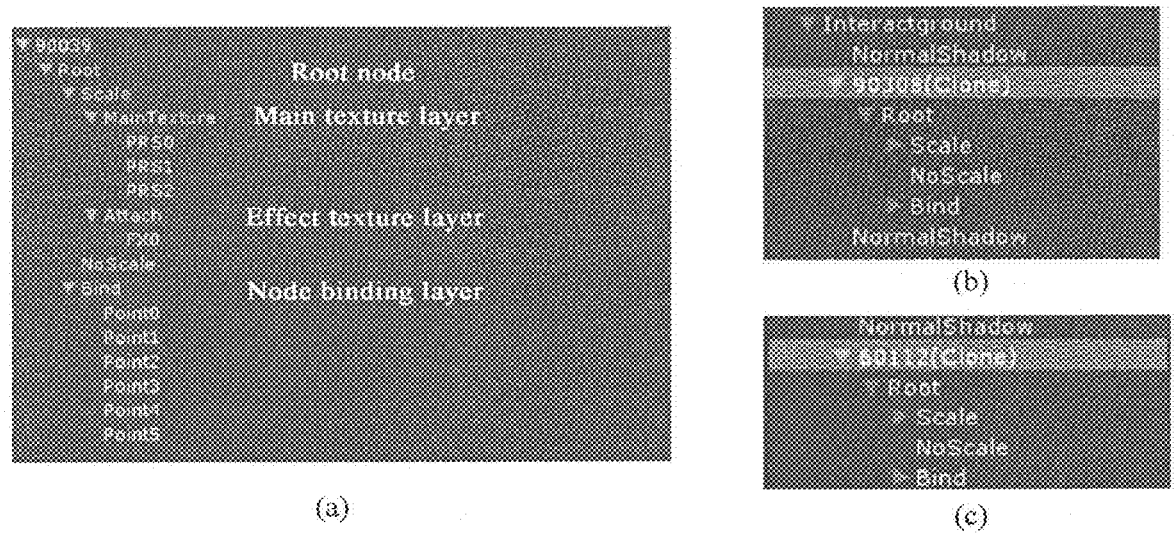
FIG. 12 is a schematic diagram of a data layer for controlling an image and a skill attribute of a virtual character according to an embodiment.

After the main character is transformed, data layers such as an original main texture layer, effect texture layer, and node binding layer are replaced, and a part of data controlled by a logical layer is not changed, to implement replacement of the representation and reservation of the data layer. As shown in FIG. 12, FIG. 12(a) is a data layer used for controlling an image and a skill attribute of a virtual character, FIG. 12(b) is a data layer used for controlling an image and a skill attribute of a main character (with an identity (ID) of 90308) before transformation, and FIG. 12(c) is a data layer used for controlling an image and a skill attribute of an enemy character (with an ID of 60112).

Figure 13:
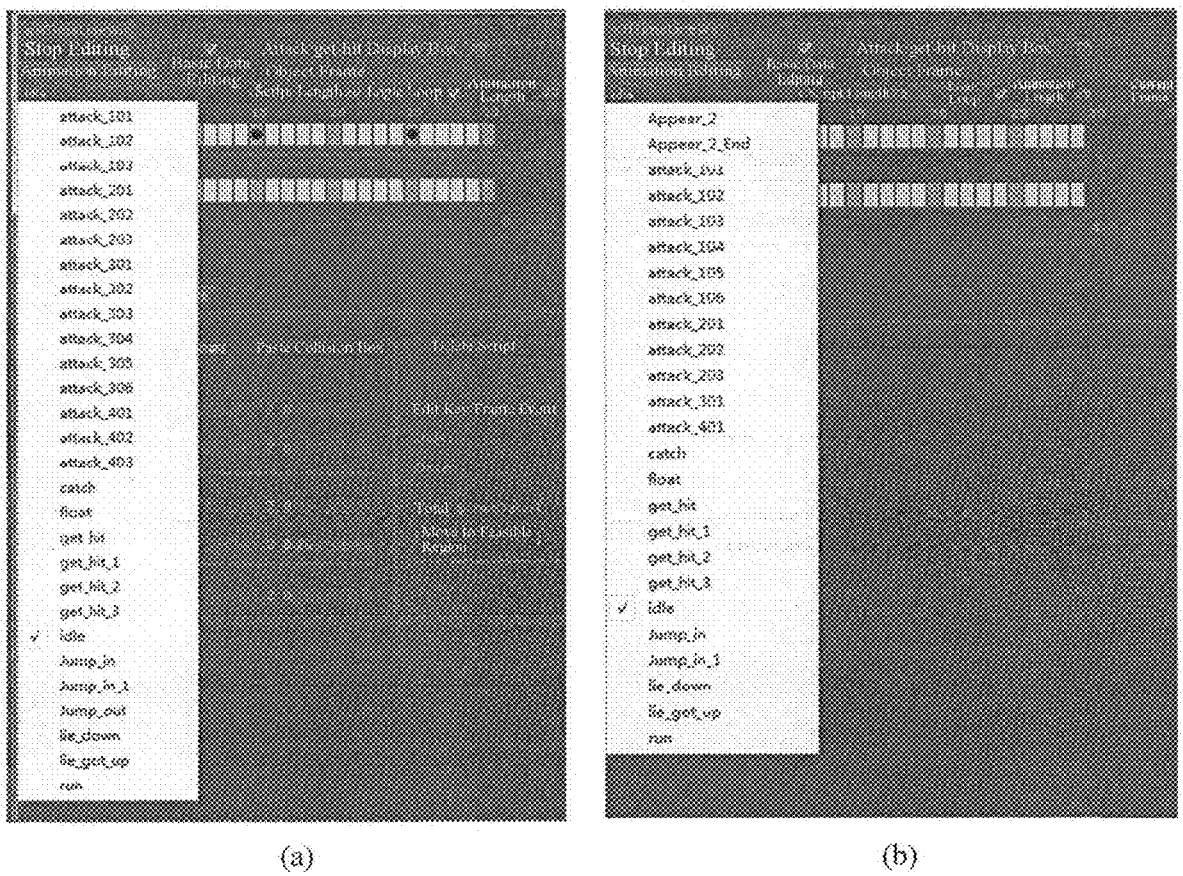
FIG. 13 is a schematic diagram of logic frames of a main character and an enemy character according to an embodiment.

Each of the main character and the enemy character has a logic frame file (that is, the role attribute resource file in the foregoing embodiments), which is actually executed content in a skill. As shown in FIG. 13(a) and FIG. 13(b), FIG. 13(a) is a logic frame of a main character 90308, and FIG. 13(b) is a logic frame of an enemy character 60112.

Figure 14:
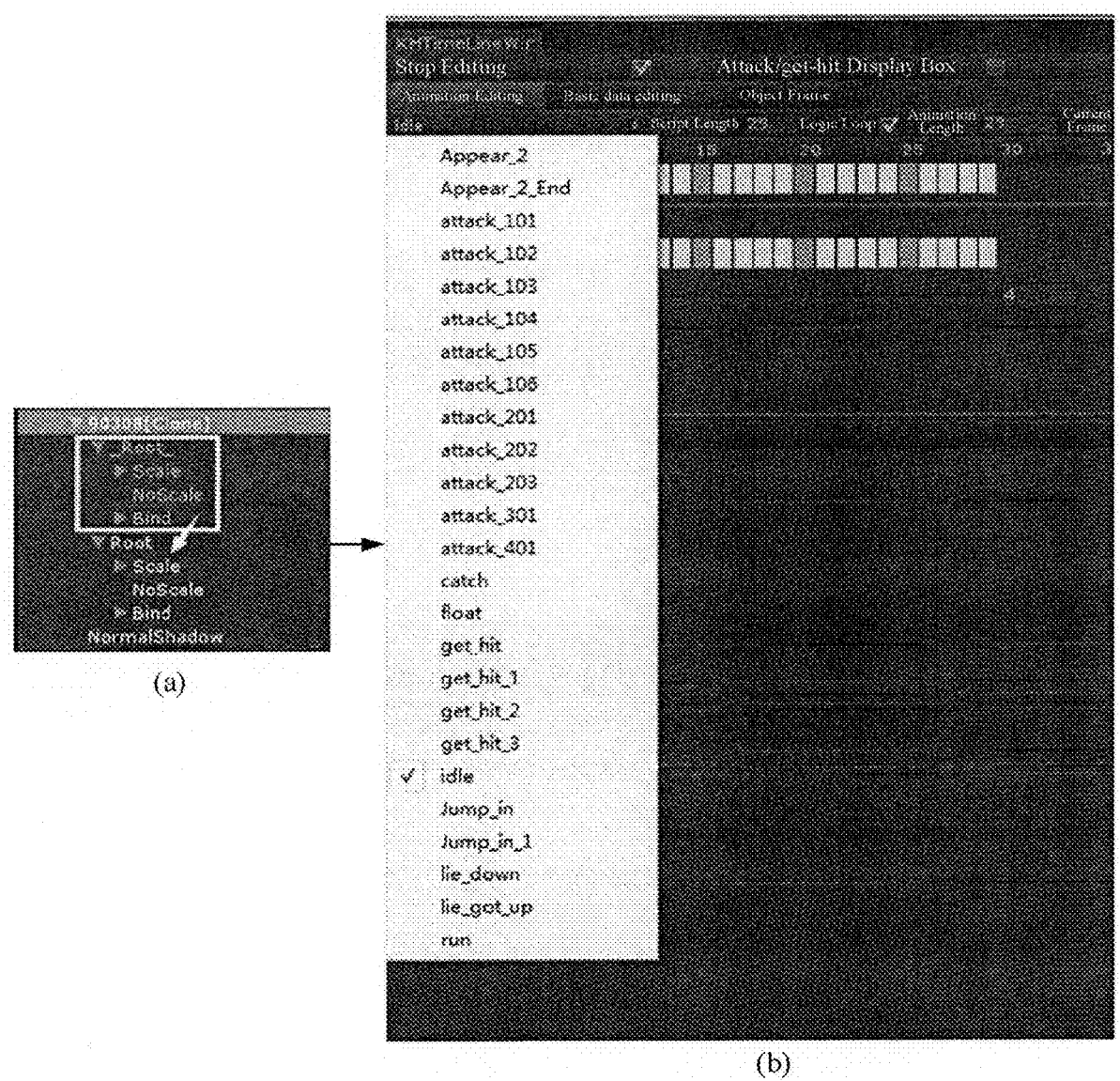
FIG. 14 is a schematic diagram in which a logic frame changes after a main character performs transformation according to an embodiment.

After the main character is transformed, as shown in FIG. 14(a), an original Root of a main character 90308 is changed into Root, that is, an original logic frame file of the main character 90308 is updated, that is, an original data layer is replaced with a data layer used for controlling a skill and an image of an enemy character 60112, and the action of the original data layer is suspended, so that a logic frame of the main character is changed, and a corresponding logic frame file is also replaced. As shown in FIG. 14 (b), it can be seen that skills of the main character 90308 are all replaced with a logic frame of the enemy character 60112.

Figure 15:
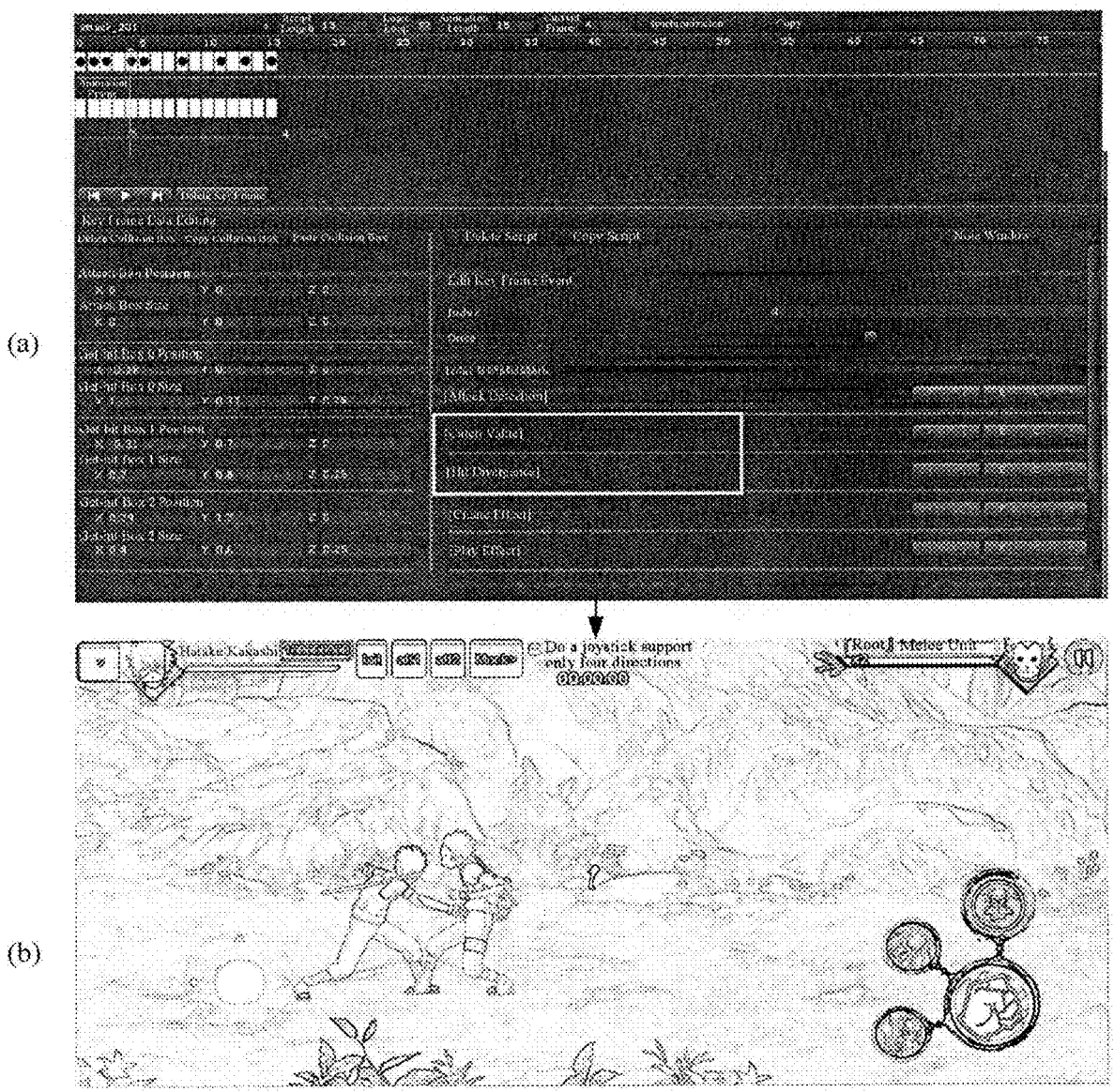
FIG. 15 is a schematic diagram of displaying a condition of catching an enemy character according to an embodiment.

As another example, before the main character is transformed, the main character needs to be controlled to catch the enemy character, as shown in FIG. 15 (a) and FIG. 15 (b). FIG. 15(a) is a condition of catching an enemy character represented by using parameters in a background, and FIG. 15 (b) is a condition of catching an enemy character displayed in a form of environment page in a foreground, that is, a catching picture viewed by a user.

Figure 16:
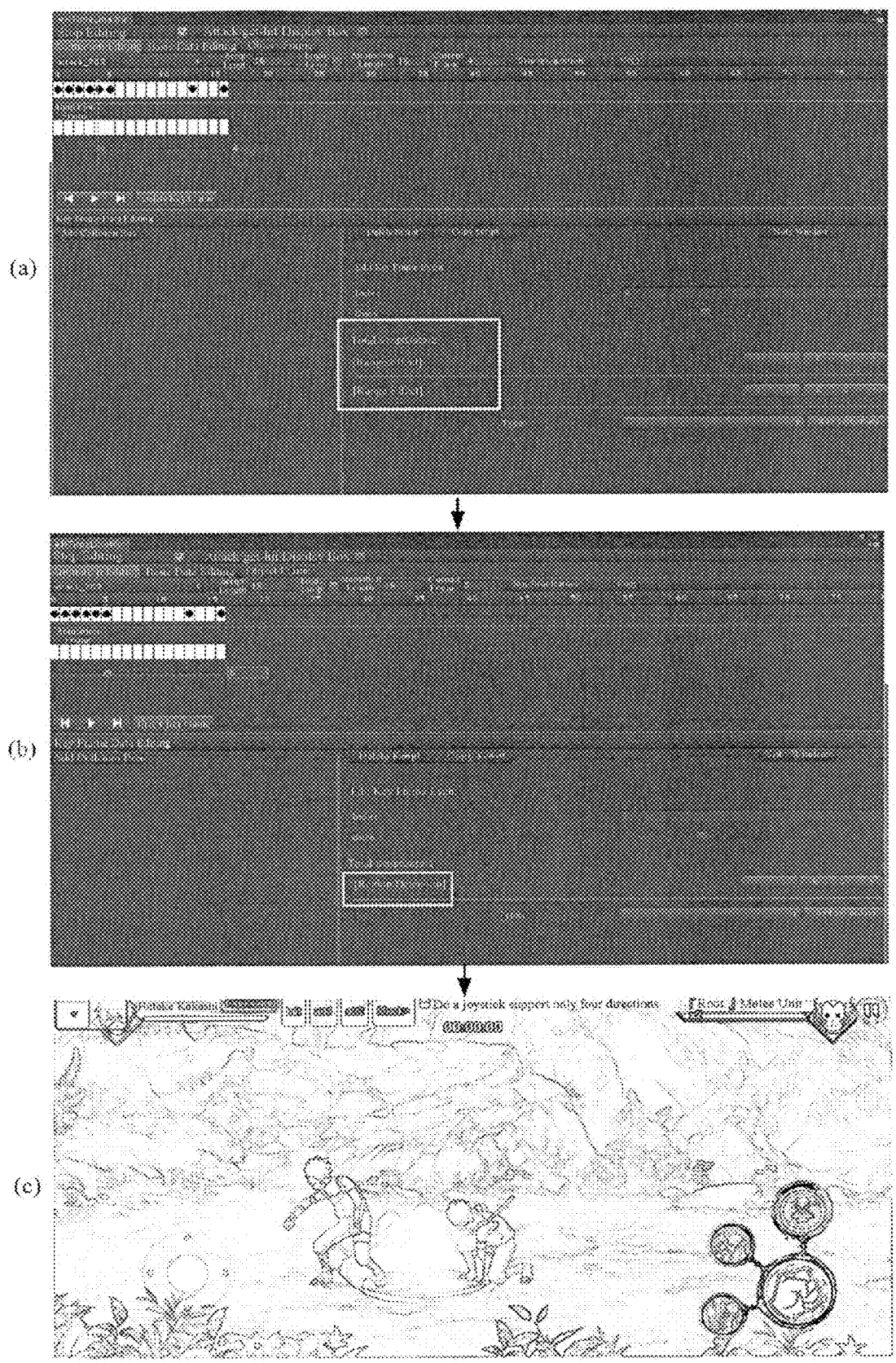
FIG. 16 is a schematic diagram of marking an enemy character according to an embodiment.

Subsequently, a region range is selected for the caught enemy character and the enemy character is marked, that is, a specific mark is added to the enemy character, to ensure that the marked enemy character is a role just caught. For example, FIG. 16(a) is a schematic diagram of adding a mark to a caught enemy character, FIG. 16 (b) is a schematic diagram of first detecting a marked enemy character within a region range, and FIG. 16(c) is a schematic diagram in which an enemy character has been locked.

Figure 17:
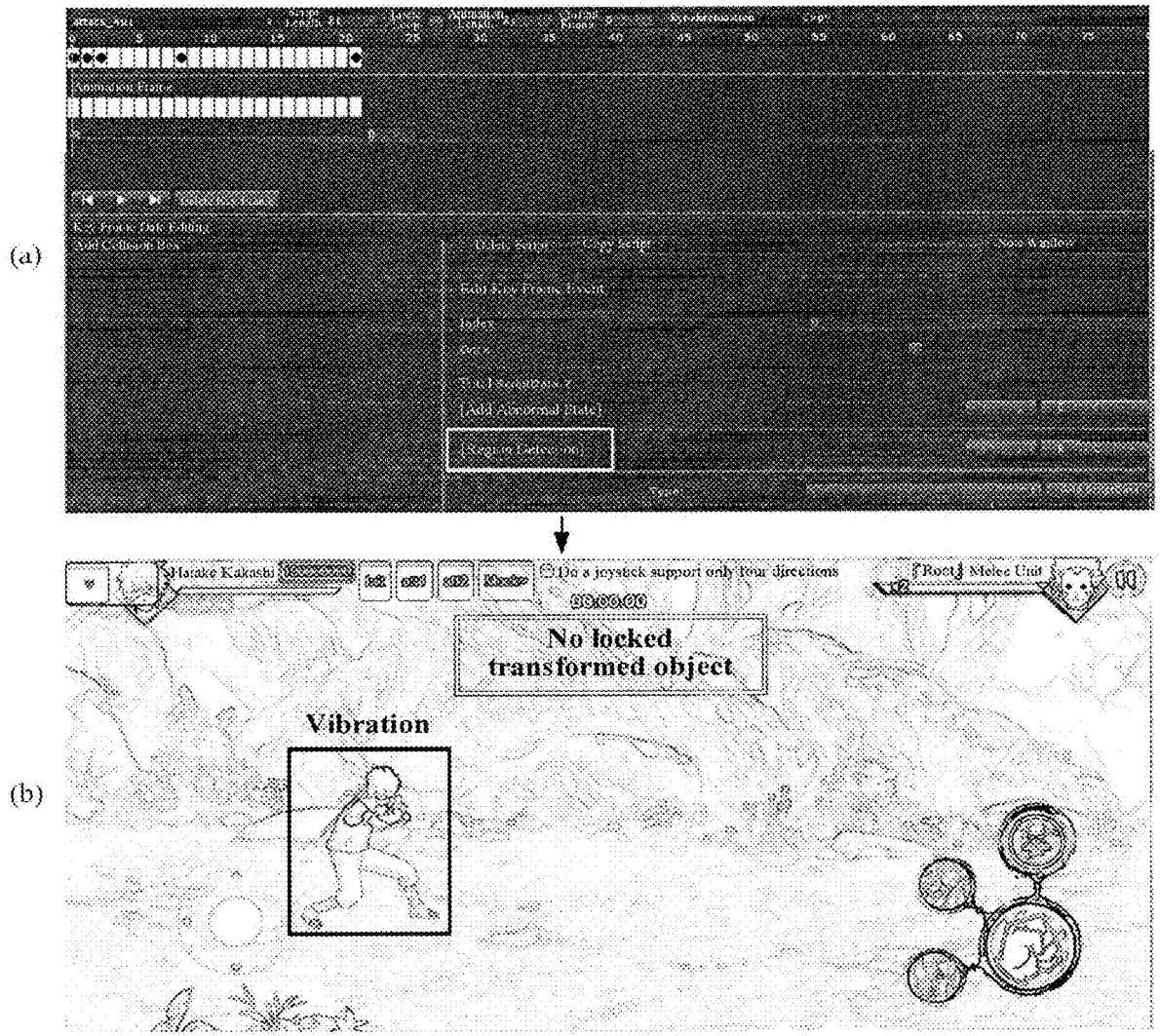
FIG. 17 is a schematic diagram in which a main character fails to transformation due to that an enemy character is not in a scene according to an embodiment.
Figure 18:
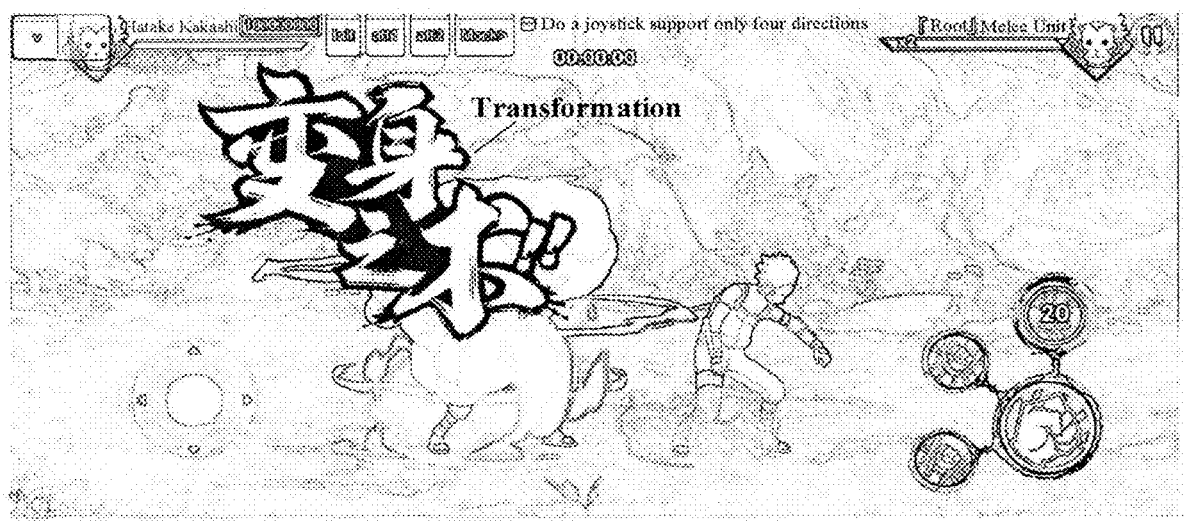
FIG. 18 is a schematic diagram in which successful transformation of a main character due to that an enemy character is in a scene according to an embodiment.

Finally, during transformation of the main character, the enemy character in the region range is detected again, to determine whether the marked enemy character survives on the field. FIG. 17 is a schematic diagram of detecting a region range of an enemy character in a background. If the locked enemy character is not on the field, a prompt that the transformation fails is provided, and the main character generates a vibration prompt (for example, a skill CD in DNF or a character vibration prompt when energy is insufficient). If the locked enemy character is still alive, a successful transformation process is entered, the main character is transformed into a role of the enemy character, and a transformation effect is displayed during transformation, as shown in FIG. 18.

In the embodiments, in a virtual environment, a user may perform role conversion on a first virtual object, to convert the first virtual object to a target virtual object having a same role as a second virtual object and may obtain a role attribute the same as that of the second virtual object and used for interaction, so that the user may not only use a role attribute of the first virtual object to attack the second virtual object in an enemy camp, but also use a role attribute the same as that of the second virtual object to attack the second virtual object, to greatly improve an interaction effect and enhance user experience, thereby greatly improving the user stickiness.

Scenario 2a. A second virtual object is a virtual character in an enemy camp, and the role conversion method is applicable to a tower-climbing task (for example, a tower-climbing game).

Figure 19:
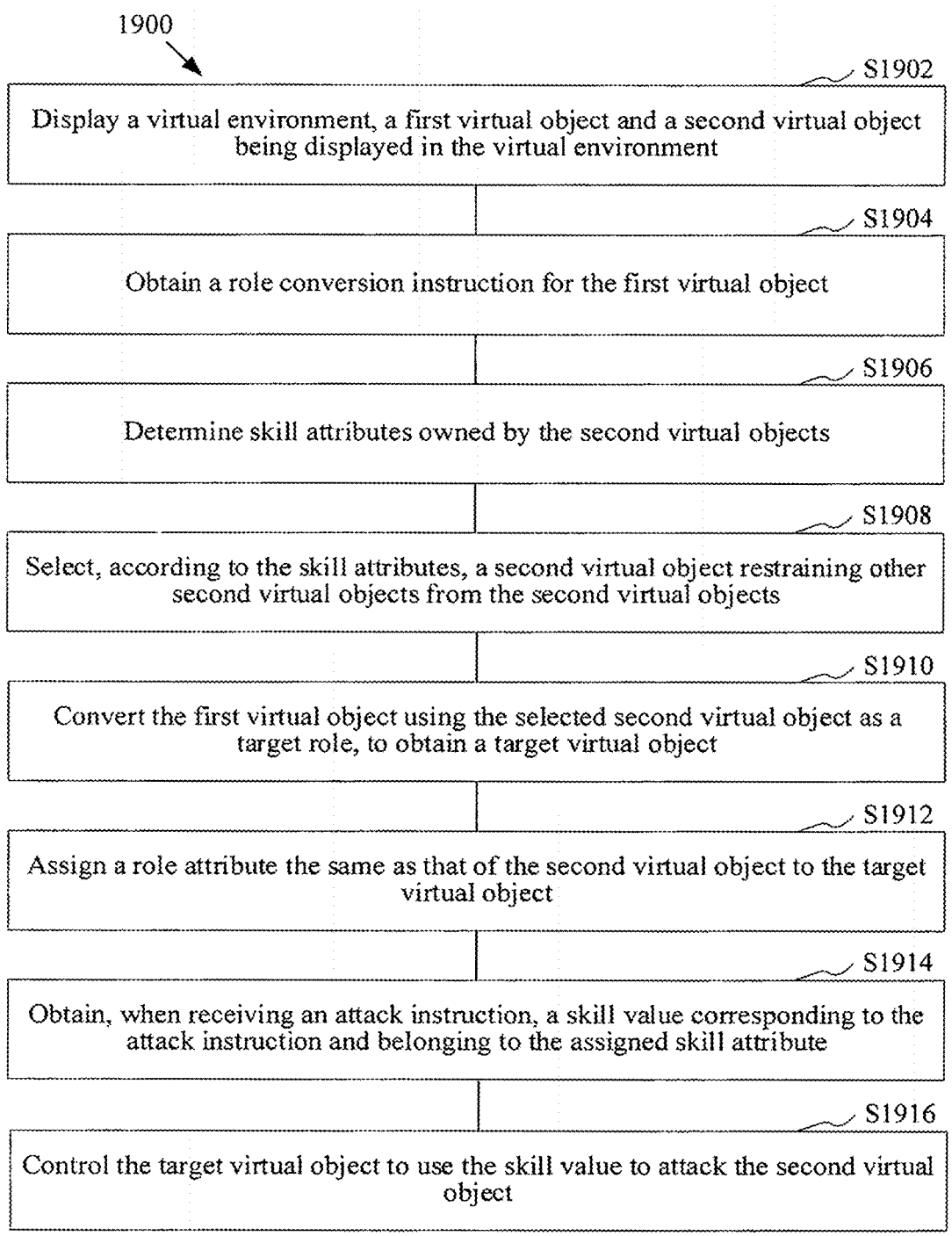
FIG. 19 is a schematic flowchart of a role conversion method according to another embodiment.

As shown in FIG. 19, the role conversion method 1900 includes the following steps.

S1902. Display a virtual environment, a first virtual object and a second virtual object being displayed in the virtual environment.

The first virtual object and the second virtual object belong to character types of different camps. There may be a plurality of second virtual objects, which are virtual objects in an enemy camp. There are virtual objects corresponding to different tower floors in the enemy camp, and in the virtual objects of different tower floors, a higher tower floor indicates a larger combat power and health point of a corresponding virtual object.

S1904. Obtain a role conversion instruction for the first virtual object.

For the specific steps of S1902 and S1904, reference may be made to S202 and S204 in the foregoing embodiments.

S1906. Determine skill attributes possessed by the second virtual objects.

S1908. Select, according to the skill attributes, a second virtual object restraining other second virtual objects from the second virtual objects.

Restraining refers to a restraint relationship between skills possessed by different virtual objects. For example, the second virtual objects include a virtual object a, a virtual object b, and a virtual object c, which respectively have a skill a, a skill b, and a skill c, and a restraint relationship among the skill a, the skill b, and the skill c may be that the skill a restrains the skill b, the skill b can restrain the skill c, and the skill c can restrain the skill a in turn. That is, each second virtual object can restrain each other.

For example, when there are three second virtual objects, which two virtual objects x and y of a same type and a virtual object z of another type, each of the virtual object x and the virtual object y has a skill b, the virtual object z has a skill a, and the skill a can restrain the skill b. Therefore, the user may select the virtual object z having the skill a as a target role.

S1910. Convert the first virtual object by using the selected second virtual object as a target role, to obtain a target virtual object.

For the step of S1910, reference may be made to S206 or S410 in the foregoing embodiments.

S1912. Assign a skill attribute the same as that of the second virtual object and used for interaction to the target virtual object.

The skill attribute may be specifically an attack skill used for attacking, a defense skill used for defending, or the like.

In an embodiment, the terminal assigns a skill attribute the same as that of the second virtual object and used for interaction to the target virtual object.

In an embodiment, after the terminal converts the first virtual object to a target virtual object, a health point and an action point of the first virtual object will continue to be used as a health point and an action point of the target virtual object.

In an embodiment, S1912 may specifically include: obtaining, by the terminal, a role attribute resource file having a mapping relationship with the second virtual object as the target role; and establishing a mapping relationship between the target virtual object and the role attribute resource file, so that the target virtual object has a role attribute the same as that of the second virtual object as the target role and used for interaction.

S1914. Obtain, when an attack instruction is received, a skill value corresponding to the attack instruction and belonging to the assigned skill attribute.

In an embodiment, when a long-range attack capability of another second virtual object is poor and a long-range attack instruction is received, the terminal obtains a long-range skill value (for example, a fire or thunder attack capability) corresponding to the long-range attack instruction and belonging to the assigned skill attribute. In an embodiment, when a close-range attack capability of another second virtual object is poor and a close-range attack instruction is received, the terminal obtains a close-range skill value (for example, a swordplay or sabreplay attack capability) corresponding to the close-range attack instruction and belonging to the assigned skill attribute.

S1916. Control the target virtual object to use the skill value to attack the second virtual object.

For the step of S1916, reference may be made to S416 in the foregoing embodiments.

In the foregoing embodiments, in a virtual environment, a user may select, from second virtual objects at a same floor, a second virtual object restraining other second virtual objects as a target role, perform role conversion on a first virtual object according to the target role, to obtain a target virtual object the same as the target role, and obtain a skill attribute the same as that of the target role. Therefore, the user may use the skill attribute restraining the other second virtual objects to attack all the second virtual objects in the virtual environment, to greatly improve an interaction effect and effectively improve a win rate of the user, thereby enhancing user experience and effectively improving the user stickiness.

Scenario 2b. A second virtual object is a virtual character in an enemy camp, and the role conversion method is applicable to a tower-climbing task (for example, a tower-climbing game). A first virtual object and a second virtual object belong to character types of different camps. A role attribute includes a skill attribute. The second virtual object belongs to an enemy camp, the enemy camp further includes other enemy virtual objects appearing at different levels, and there is a restraint relationship among virtual objects at different levels in the enemy camp.

Figure 20:
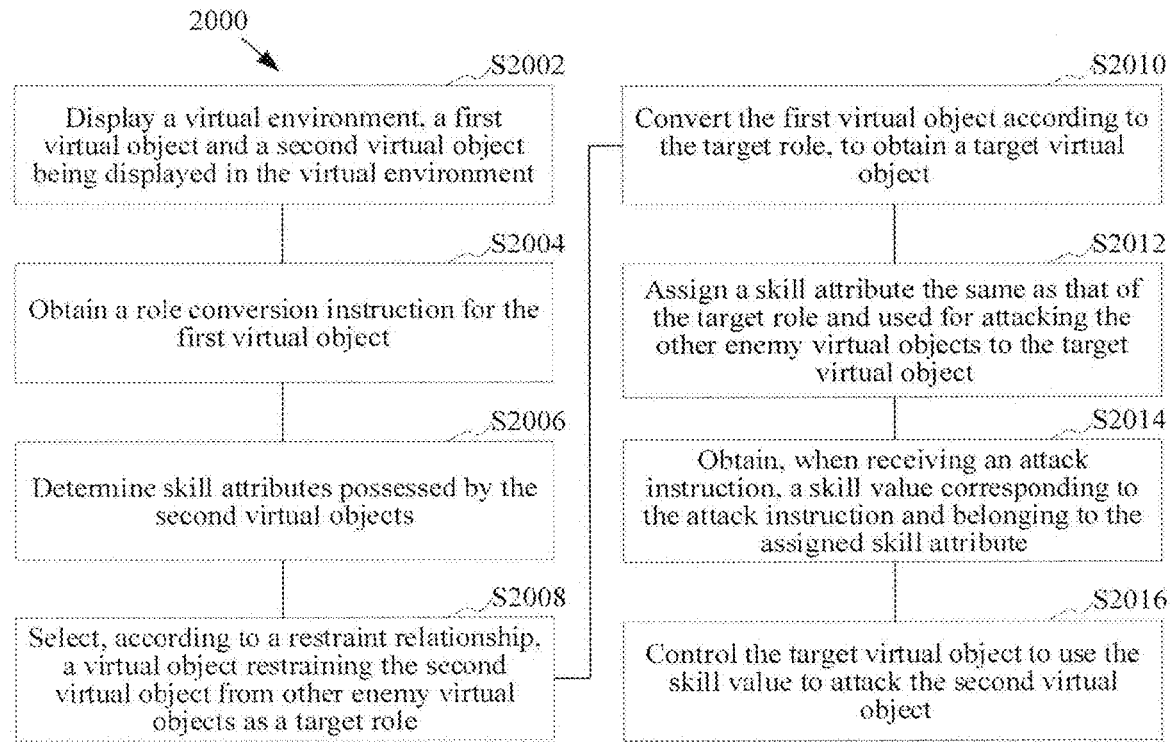
FIG. 20 is a schematic flowchart of a role conversion method according to another embodiment.

As shown in FIG. 20, the role conversion method 2000 includes the following steps.

S2002. Display a virtual environment, a first virtual object and a second virtual object being displayed in the virtual environment.

S2004. Obtain a role conversion instruction for the first virtual object.

S2006. Determine skill attributes possessed by the second virtual objects.

S2008. Select, according to a restraint relationship, a virtual object restraining the second virtual object from other enemy virtual objects as a target role.

S2010. Convert the first virtual object according to the target role, to obtain a target virtual object.

S2012. Assign a skill attribute the same as that of the target role and used for attacking the other enemy virtual objects to the target virtual object.

S2014. Obtain, when an attack instruction is received, a skill value corresponding to the attack instruction and belonging to the assigned skill attribute.

S2016. Control the target virtual object to use the skill value to attack the second virtual object.

For the step of S2002, reference may be made to S1902 to S1916 in the foregoing embodiments.

Figure 21:
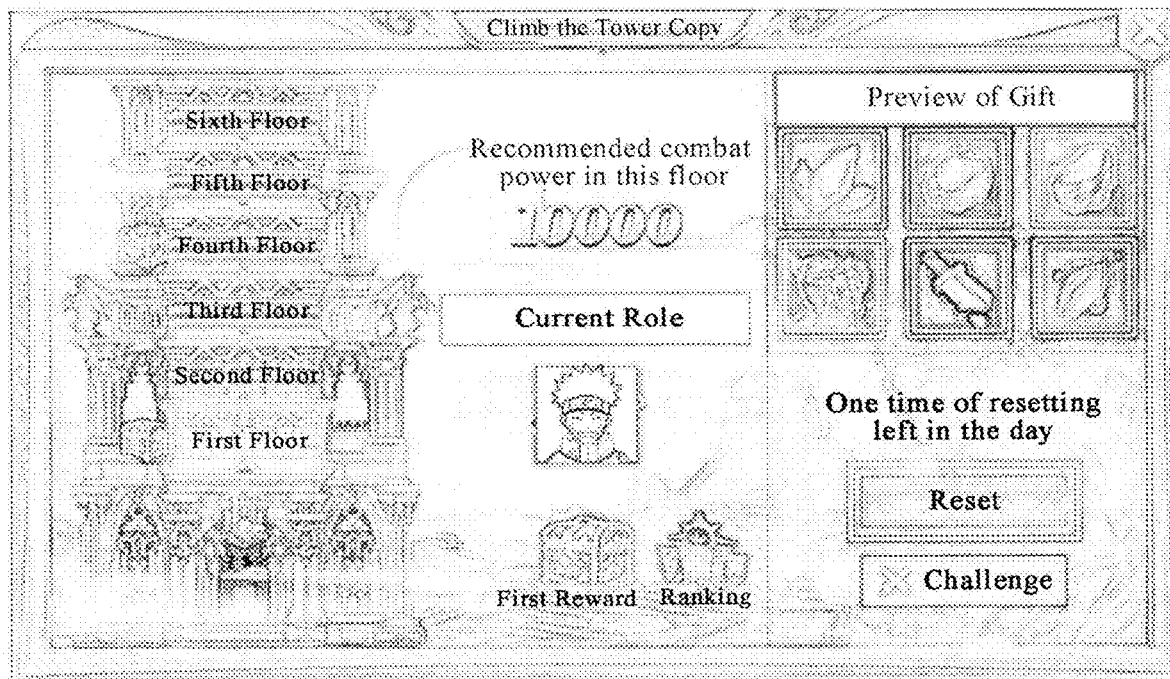
FIG. 21 is a schematic diagram of a tower-climbing game according to an embodiment.

As an example, as shown in FIG. 21, the role conversion method is applicable to a tower-climbing game. For example, levels that need to be cleared are made into a similar tower-climbing mode in which a scene layout and an enemy monster are completely random, and there are similar attributes or weapon restraint between enemy characters (including enemy monsters) in an enemy camp. A user needs to select one enemy character from the enemy camp according to a restraint relationship between different enemy characters for transformation.

Based on a transformation play, a new tower-climbing play requires to switch a role at each floor according to an actual situation rather than accumulation of pure values. Combined with the candidate roles in FIG. 10 and the gifts that can be combined, the play is more in-depth.

In a tower-climbing game, different enemy characters appear at each floor, the enemy characters may be completely random, and a quantity of enemy characters is increased as a quantity of floors is increased. A user needs to select a proper enemy character according to a variable type of the enemy character at each floor for transformation. Every n floors (for example, five floors) are one node, one BOSS needs to be challenged at the end of the node, and a main character obtains a reward and a strengthened skill after the challenge. In addition, the main character controlled by the user can climb the tower infinitely.

In the foregoing embodiments, in a virtual environment, a user may select, from other enemy virtual objects at different floors in an enemy camp, a virtual object restraining second virtual objects at a current floor as a target role, then perform role conversion on a first virtual object according to the target role, to obtain a target virtual object the same as the target role, and obtain a skill attribute the same as that of the target role. Therefore, the user may use the skill attribute restraining the second virtual object to attack all the second virtual objects in the virtual environment, to greatly improve an interaction effect and effectively improve a win rate of the user, thereby enhancing user experience and effectively improving the user stickiness.

Scenario 3. A second virtual object is a virtual item, and the role conversion method is applicable to a look-up task (for example, a peek-a-boo game). A first virtual object belongs to a character type. A second virtual object includes at least two candidate virtual items. A role attribute is an item attribute.

Figure 22:
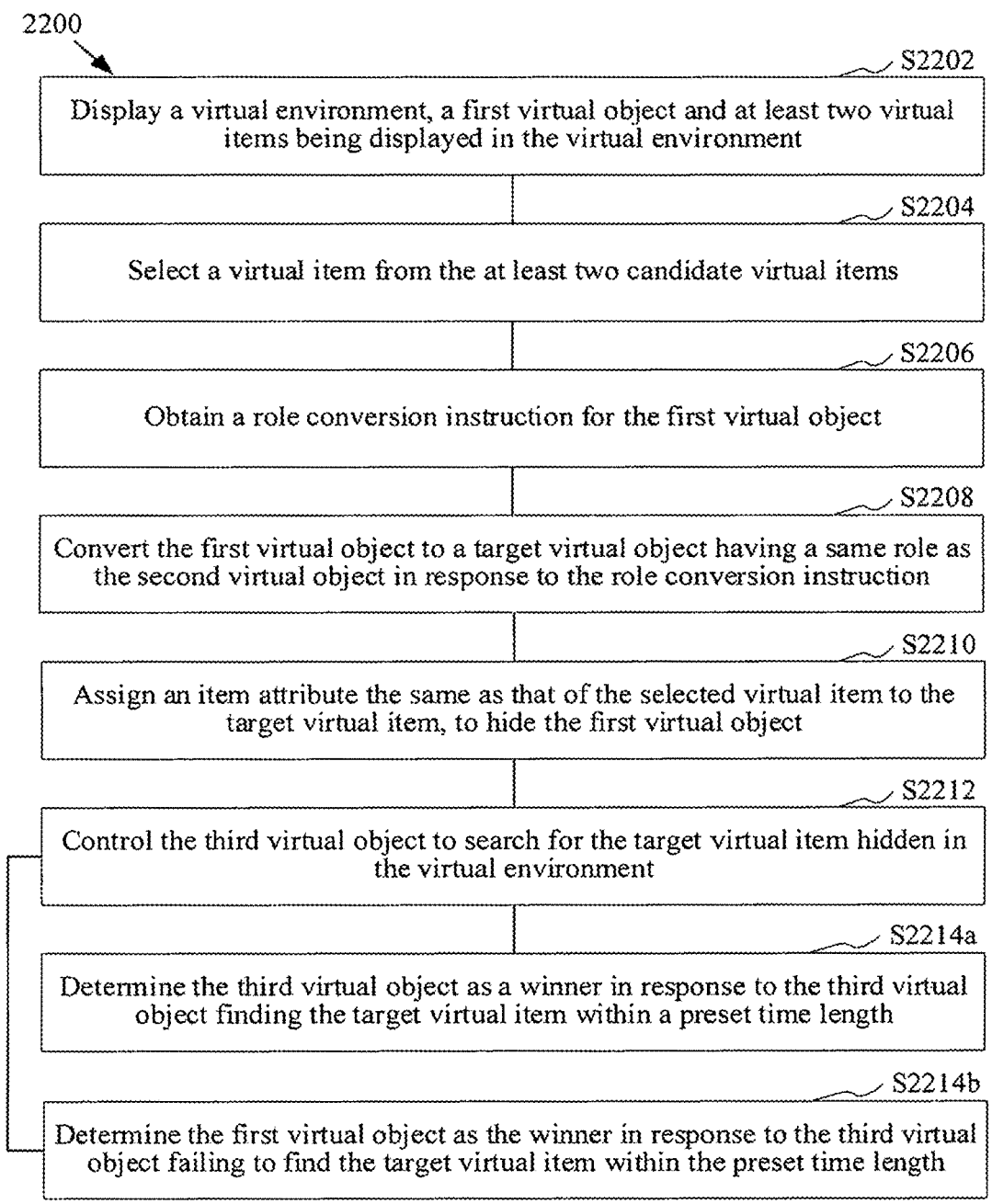
FIG. 22 is a schematic flowchart of a role conversion method according to another embodiment.

As shown in FIG. 22, the role conversion method 2200 includes the following steps.

S2202. Display a virtual environment, a first virtual object and at least two virtual items being displayed in the virtual environment.

The virtual environment may further include a third virtual object belonging to a character type. The third virtual object may be a virtual object controlled by a computer or may be a virtual object operated by another user by using a terminal. For example, two users respectively operate the first virtual object and the third virtual object by using a same (or different) terminal.

For the step of S2202, reference may be made to S202 in the foregoing embodiments.

S2204. Select a virtual item from the at least two candidate virtual items.

The virtual item may be a virtual cap, a virtual decoration, a virtual chair, a virtual box, a virtual barrel, or the like.

In an embodiment, S2204 may specifically include: selecting, by the terminal, the virtual item from the at least two candidate virtual items according to a selection instruction input; or determining hiding coefficients of the at least two candidate virtual items in the virtual environment, and selecting the virtual item corresponding to a maximum hiding coefficient from the at least two candidate virtual items.

S2206. Obtain a role conversion instruction for the first virtual object.

In an embodiment, before S2204, the terminal may determine a distance between the first virtual object and the virtual item and obtain the role conversion instruction for the first virtual object when the distance is less than a preset distance. Alternatively, the terminal determines whether the first virtual object touches the virtual item, and obtains the role conversion instruction for the first virtual object when the first virtual object touches the virtual item.

In an embodiment, when the user triggers a role conversion button on a user interface or performs another operation (for example, double clicking/tapping or long pressing the virtual item) meeting the role conversion, the terminal generates the role conversion instruction used for converting the first virtual object to an item same as the virtual item.

S2208. Convert the first virtual object to a target virtual item the same as the selected virtual item in response to the role conversion instruction.

In an embodiment, the terminal obtains item data according to the virtual item, performs image rendering according to the item data, to obtain a target virtual item, determines a position of the target virtual item to be displayed in the virtual environment, and replaces the first virtual object with the target virtual item and displays the target virtual item in the virtual environment according to the position. During replacement, a corresponding replacement effect may be displayed.

The position to be displayed may be a position of the first virtual object before conversion or may be a position with a fixed distance from the virtual item and meeting a distribution of the virtual environment.

S2210. Assign an item attribute the same as that of the selected virtual item to the target virtual item, to hide the first virtual object.

For example, the terminal assigns a reflection capability, an odor, and a color changing capability the same as that of the selected virtual item to the target virtual item, to hide the first virtual object.

In an embodiment, the item attribute may further include a corresponding damage capability when the virtual item is used for attacking. When the third virtual object is close to the target virtual item, and if the target virtual item is not recognized in time, the target virtual item may cause damage to the third virtual object by releasing toxic gas, to reduce a health point of the third virtual object.

In an embodiment, the terminal obtains a role attribute resource file having a mapping relationship with the selected virtual item; and establishes a mapping relationship between the target virtual item and the role attribute resource file, so that the target virtual item has an item attribute the same as that of the virtual item and used for interaction.

S2212. Control the third virtual object to search for the target virtual item hidden in the virtual environment.

In an embodiment, to avoid a case that the target virtual item after role conversion has been hidden in the virtual environment all the time and cannot be found, in the search, the terminal controls the third virtual object to cast a cracking skill; restores the target virtual item to the first virtual object when a distance between the target virtual item and the third virtual object is within a radiation range of the cracking skill; and determines the third virtual object as a winner when the third virtual object catches the restored first virtual object. By assigning the cracking skill to the third virtual object, a hidden target virtual object can appear in an original shape within an effective radiation range, which improves the playability of the interaction process.

The cracking skill has an effective radiation range, and the target virtual item within the radiation range is forcibly restored to an original appearance (that is, restored to the first virtual object)

In an embodiment, in the search, the terminal receives a cracking skill instruction inputted by the user and casts the cracking skill according to the cracking skill instruction. When the distance between the target virtual item and the third virtual object is within the radiation range of the cracking skill, the terminal obtains skeleton data and costume data of the first virtual object, and renders the skeleton data and the costume data, to restore the target virtual item to the original first virtual object, so that the third virtual object can catch the first virtual object.

In an embodiment, the terminal determines whether the cracking skill is in a skill cooldown; performs the operation of controlling the third virtual object to cast a cracking skill in case that the cracking skill is not in the skill cooldown; and refuses to perform the operation of controlling the third virtual object to cast a cracking skill in case that the cracking skill is in the skill cooldown. Setting of the skill cooldown can avoid a case that the first virtual object is converted to the target virtual item without a limit and is hidden in the virtual environment, which is beneficial to the fairness and play ability of the interaction process.

The skill cooldown refers to a period time from when the third virtual object uses a cracking skill once to the third virtual object can use the cracking skill at the next time in a role conversion task.

In an embodiment, to avoid a case that the converted target virtual item is hidden in the virtual environment for a long time, a state retention time may be set. When the first virtual object is converted to the target virtual item, the terminal calculates a state retention time of the target virtual item. When the state retention time reaches a preset time length, the terminal restores the target virtual item to the first virtual object.

In an embodiment, the terminal records a corresponding conversion time when the first virtual object is converted to the target virtual item, and calculates a state retention time of the target virtual item based on the conversion time. If the state retention time reaches a preset time length, the terminal obtains skeleton data and costume data of the first virtual object, generates the first virtual object according to the skeleton data and the costume data, and replaces the target virtual item in the virtual environment with the first virtual object.

S2214a. Determine the third virtual object as a winner when the third virtual object finds the target virtual item within a preset time length.

That the third virtual object finds the target virtual item may mean that the third virtual object may find the target virtual object from all virtual items according to an inputted recognition instruction, so that the target virtual object is restored to the first virtual object.

In an embodiment, after finding the target virtual object, the terminal restores the target virtual object to the first virtual object and controls the third virtual object to catch the first virtual object, to determine the third virtual object as a winner.

S2214b. Determine the first virtual object as the winner when the third virtual object does not find the target virtual item within the preset time length.

As an example, through the role conversion method, a main character controlled by a user is changed into some other items (for example, some virtual things in a game scene). For example, there are a hiding party and a finding party (that is, a ghost) in a peek-a-boo game. The hiding party is transformed into one item in a scene by using a transformation capability to hide, and the ghost recognizes and catches the hiding party.

Figure 23:
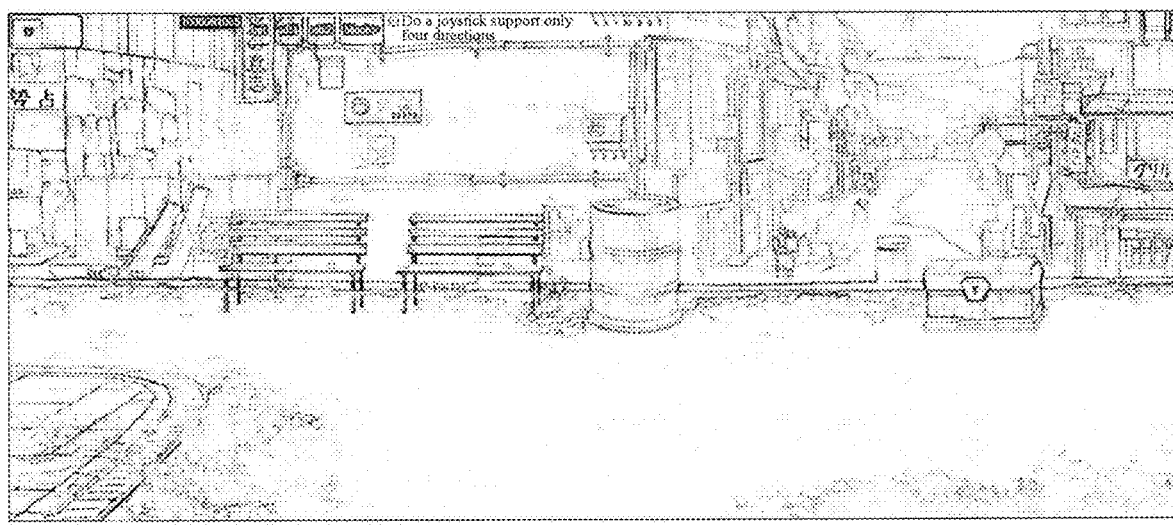
FIG. 23 is a schematic diagram of a field of view of a ghost according to an embodiment.

A rough play is that at the beginning, the ghost may view a game scene once to remember things in the scene. Subsequently, the hiding party is transformed into a thing in the scene and is hidden in the scene. The ghost recognizes and catches the hiding party through various means, and the hiding party needs to hide himself well and adjust a transformation location in time for hiding to the end. Start as follows:

All maps (only a small map is used as an example herein) are viewed from a field of view of the ghost (as shown in FIG. 23), so that the ghost recognizes, according to the remembered things in the scene, a fake thing transformed from the hiding party from the scene.

Figure 24:
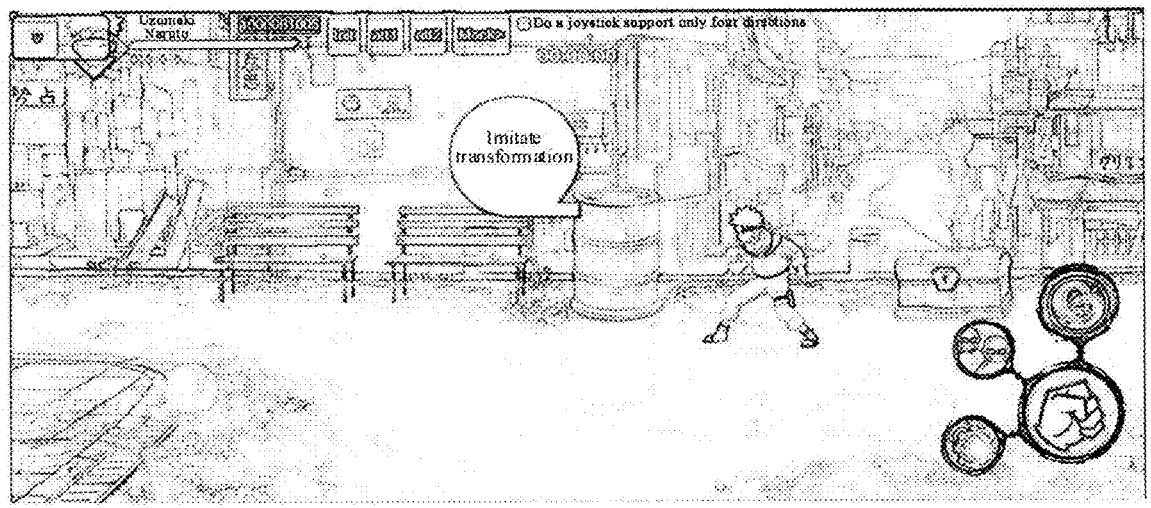
FIG. 24 is a schematic diagram of a field of view of a hiding party according to an embodiment.

From a field of view of the hiding party (as shown in FIG. 24), the hiding party selects a thing to be transformed from the scene (for example, selects a barrel as a transformation target).

Figure 25:
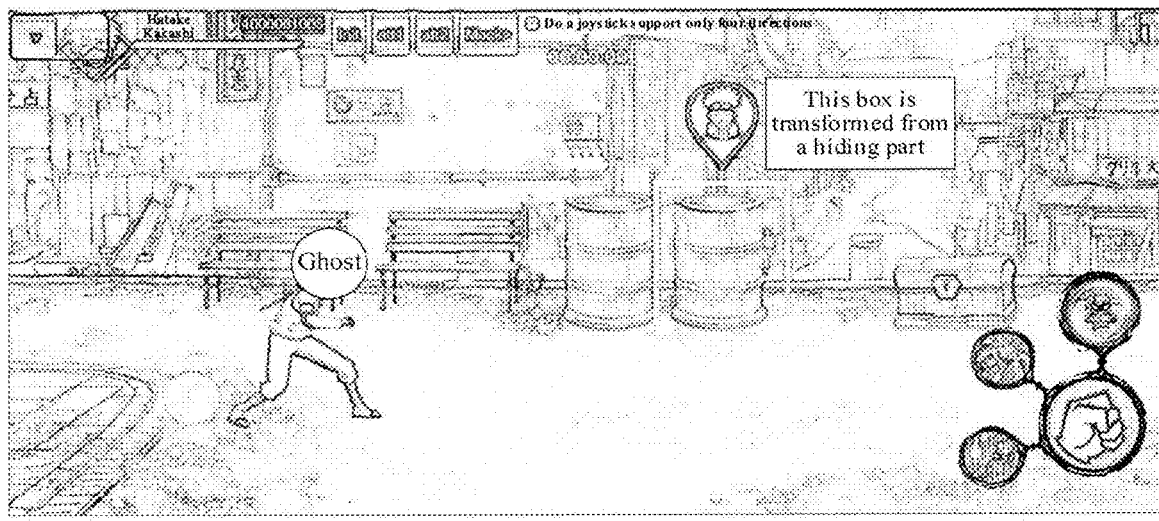
FIG. 25 is a schematic diagram after a hiding party selects a thing to perform transformation according to an embodiment.
Figure 26:
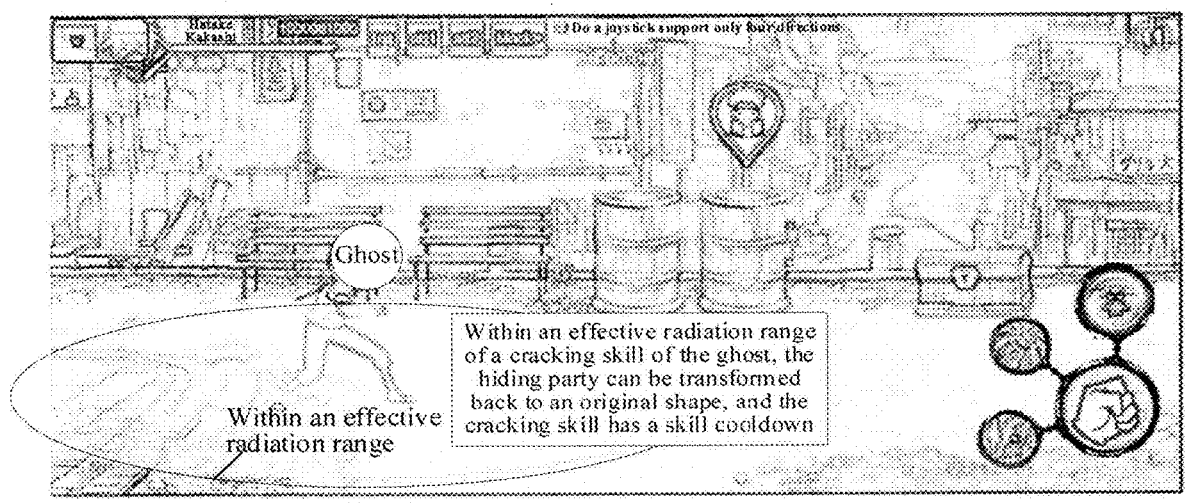
FIG. 26 is a schematic diagram in which a ghost finds a hiding party by using a cracking skill according to an embodiment.

When the game is started, the ghost goes to find an extra thing (that is, the fake thing to which the hiding party is transformed) in a current scene, as shown in FIG. 25. In addition, the ghost may further start a cracking skill to crack the transformation of the hiding party, but the cracking skill has a skill cooldown and an effective radiation range of the cracking skill is limited. The effective radiation range of the cracking skill is a radiation region of a specific area centered on the ghost, as shown in FIG. 26.

Figure 27:
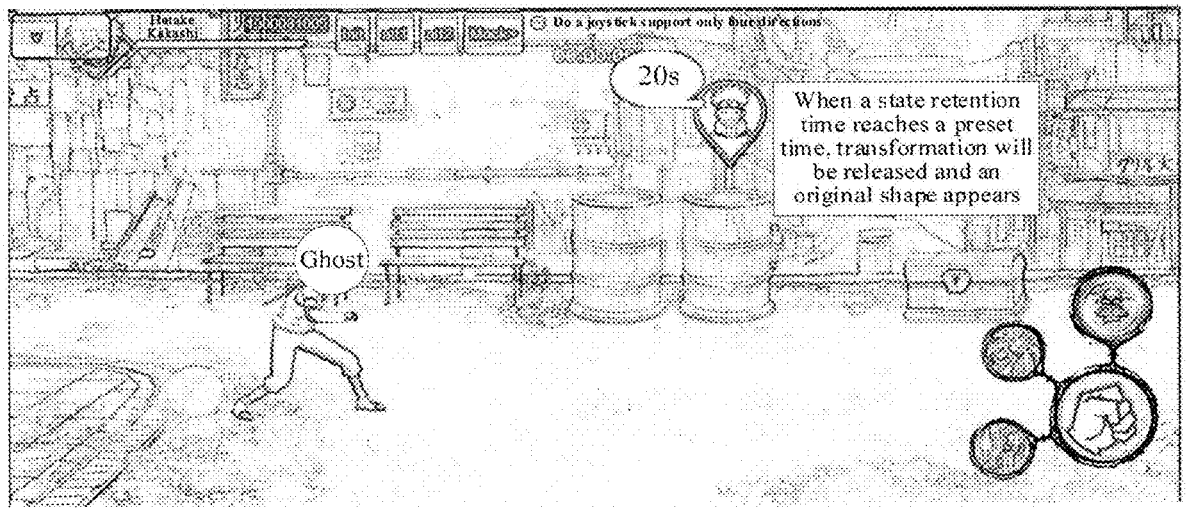
FIG. 27 is a schematic diagram in which a hiding party performs hiding when a state retention time is less than a preset time length according to an embodiment.
Figure 28:
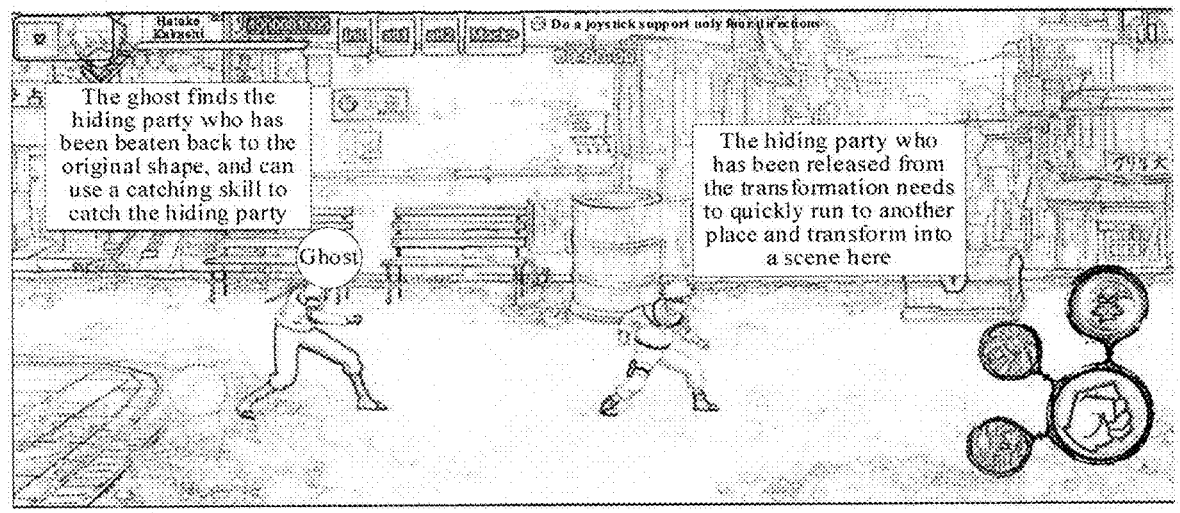
FIG. 28 is a schematic diagram after a hiding party releases transformation according to an embodiment.

Conversely, for the hiding party transformed into the thing in the scene, a transformation time (that is, a state retention time) is limited. As shown in FIG. 27, when the state retention time reaches a preset time length, the hiding party will be restored to an original appearance. If finding the hiding party that has changed back to the original shape, the ghost can go to catch the hiding party, as shown in FIG. 28.

In addition, if the state retention time does not reach the preset time length, the hiding may also actively release transformation, to find a next to-be-transformed thing in the scene.

Within a certain period of time, if the ghost catches all the hiding parties, the ghost wins. Otherwise, the hiding party wins.

In the foregoing embodiments, a user selects one virtual item from a virtual environment, then performs role conversion on a first virtual object, to obtain a target virtual item the same as the selected virtual item, and obtains an item attribute the same as that of the selected virtual item. Therefore, the user may perform hiding by using the target virtual item, so that a third virtual object is hard to find and catch the first virtual object, to improve an interaction effect and effectively improve a win rate of the user, thereby enhancing user experience and effectively improving the user stickiness.

It is to be understood that, although the steps in the flowcharts of FIG. 2, FIG. 19, FIG. 20, and FIG. 22 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. Moreover, at least some of the steps in FIG. 2, FIG. 19, FIG. 20, and FIG. 22 may include a plurality of steps or a plurality of stages. These steps or stages are not necessarily performed at the same moment, but may be performed at different moments. These steps or stages are not necessarily executed sequentially, but may be performed in turn or alternately with another step or at least some of steps or stages of the another step.

Figure 29:
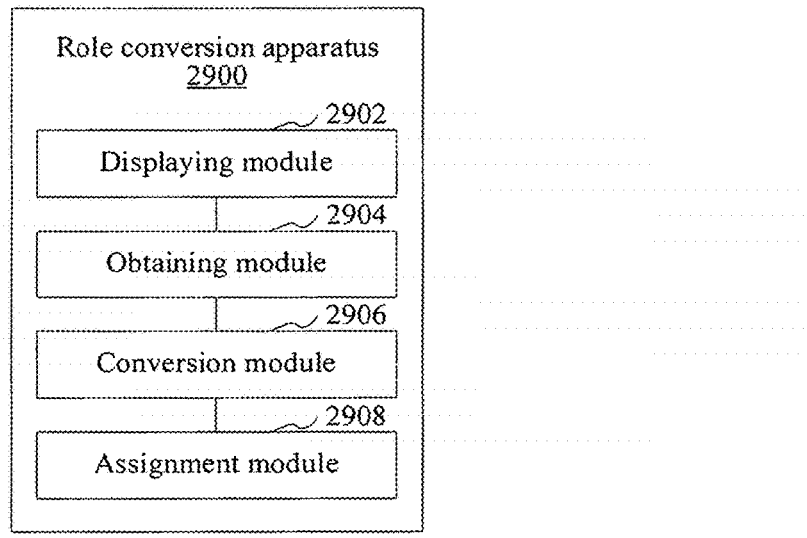
FIG. 29 is a structural block diagram of a role conversion apparatus according to an embodiment.

In an embodiment, as shown in FIG. 29, a role conversion apparatus 2900 is provided. The apparatus 2900 specifically includes: a displaying module 2902, an obtaining module 2904, a conversion module 2906, and an assignment module 2908.

Herein, the term module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The displaying module 2902 is configured to display a virtual environment, a first virtual object and a second virtual object being displayed in the virtual environment.

The obtaining module 2904 is configured to obtain a role conversion instruction for the first virtual object.

The conversion module 2906 is configured to convert the first virtual object to a target virtual object having a same role as the second virtual object in response to the role conversion instruction.

The assignment module 2908 is configured to assign a role attribute the same as that of the second virtual object to the target virtual object.

In the embodiments, in a virtual environment, a user may perform role conversion on a first virtual object, to convert the first virtual object to a target virtual object having a same role as a second virtual object and may obtain a role attribute the same as that of the second virtual object, so that the user may not only use a role attribute of the first virtual object to interact with the second virtual object, but also use the role attribute the same as that of the second virtual object to interact with the second virtual object, to greatly improve an interaction effect.

In an embodiment, the first virtual object and the second virtual object belong to character types of different camps. The conversion module 2906 is further configured to obtain the role conversion instruction for the first virtual object when the first virtual object catches the second virtual object or a distance between the second virtual object and the firsts virtual object is less than a preset distance.

Figure 30:
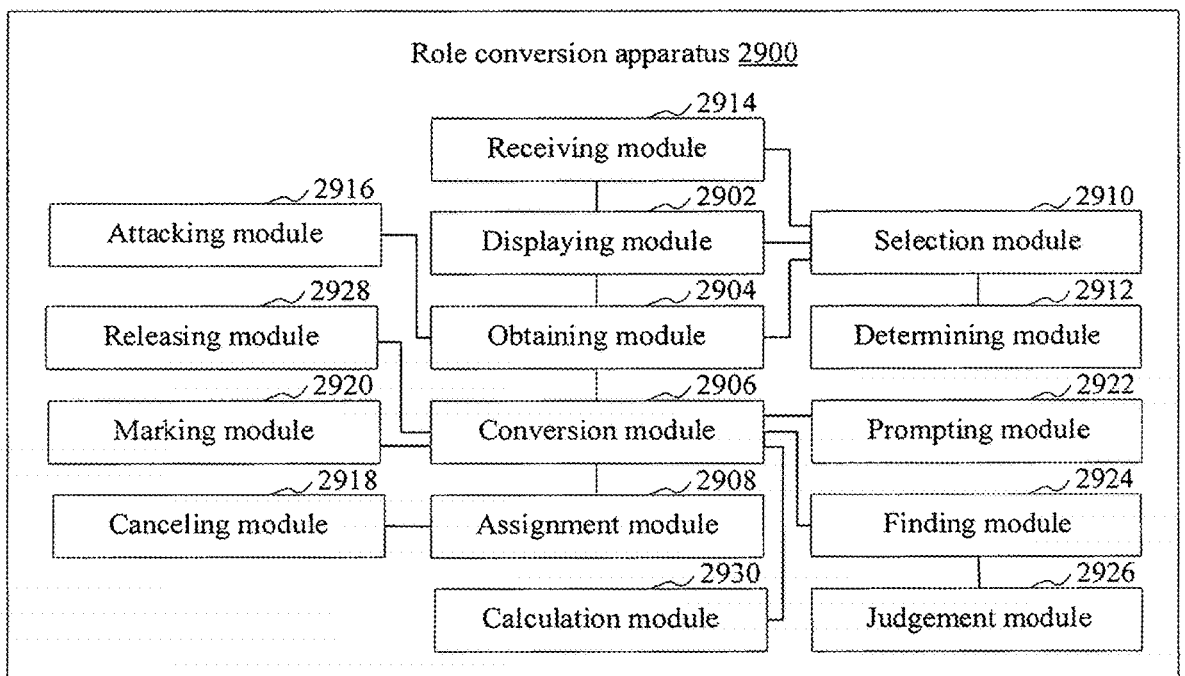
FIG. 30 is a structural block diagram of a role conversion apparatus according to another embodiment.

In an embodiment, the first virtual object is a role of which an attack capability is to be strengthened. The first virtual object and the second virtual object belong to the character types of different camps. As shown in FIG. 30, the apparatus further includes: a selection module 2910 and a determining module 2912.

The selection module 2910 is configured to select a second virtual object with a strengthened attack capability from at least two second virtual objects before the role conversion instruction for the first virtual object is obtained.

The determining module 2912 is configured to perform the operation of obtaining a role conversion instruction for the first virtual object when the first virtual object catches the second virtual object with the strengthened attack capability; or perform the operation of obtaining a role conversion instruction for the first virtual object when a distance between the second virtual object with the strengthened attack capability and the first virtual object is less than a preset distance.

In an embodiment, as shown in FIG. 30, the apparatus further includes a receiving module 2914.

The displaying module 2902 is further configured to display a role selection page, at least two candidate roles being displayed in the role selection page.

The receiving module 2914 is configured to receive a selection instruction input.

The selection module 2910 is further configured to select, according to the selection instruction, a role of which an attack capability is to be strengthened from the candidate roles.

The displaying module 2902 is further configured to use the role of which the attack capability is to be strengthened as the first virtual object displayed in the virtual environment.

In an embodiment, the first virtual object and the second virtual object belong to the character types of different camps. A role attribute includes a skill attribute. As shown in FIG. 30, the apparatus further includes: an attacking module 2916.

The obtaining module 2904 is further configured to obtain, when an attack instruction is received, a skill value corresponding to the attack instruction and belonging to the assigned skill attribute.

The attacking module 2916 is configured to control the target virtual object to use the skill value to attack the second virtual object.

In an embodiment, the conversion module 2906 is further configured to perform role conversion on the target virtual object after the target virtual object is controlled to use the skill value to attack the second virtual object and when a health point of the second virtual object reaches a restoration condition or a role restoration instruction is received, so that the target virtual object is restored to the first virtual object.

In an embodiment, as shown in FIG. 30, the apparatus further includes: a canceling module 2918.

The canceling module 2918 is configured to cancel the skill attribute assigned to the target virtual object and consistent with that of the second virtual object.

The assignment module 2908 is further configured to assign an originally possessed skill attribute to the restored first virtual object.

In an embodiment, the conversion module 2906, is further configured to obtain skeleton data and corresponding costume data of the first virtual object; generate the first virtual object according to the skeleton data and the costume data of the first virtual object; and replace the target virtual object with the first virtual object in the virtual environment.

In an embodiment, as shown in FIG. 30, the apparatus further includes: a marking module 2920.

The marking module 2920 is configured to mark the caught second virtual object or the second virtual object within a preset distance range.

The conversion module 2906 is further configured to convert the first virtual object to the target virtual object having the same role as the second virtual object when the health point of the marked second virtual object reaches a conversion condition.

In an embodiment, as shown in FIG. 30, the apparatus 2900 further includes: a prompting module 2922.

The prompting module 2922 is configured to display, when the health point of the marked second virtual object does not reach the conversion condition, prompt information indicating that the role conversion fails at a picture level of the virtual environment; and control the first virtual object to vibrate.

In the embodiments, in a virtual environment, a user may perform role conversion on a first virtual object, to convert the first virtual object to a target virtual object having a same role as a second virtual object and may obtain a role attribute the same as that of the second virtual object and used for interaction, so that the user may not only use a role attribute of the first virtual object to attack the second virtual object in an enemy camp, but also use a role attribute the same as that of the second virtual object to attack the second virtual object, to greatly improve an interaction effect and enhance user experience, thereby greatly improving the user stickiness.

In an embodiment, the role attribute includes the skill attribute. The first virtual object and the second virtual object belong to the character types of different camps. The selection module 2910 is further configured to determine skill attributes possessed by the second virtual objects; and select, according to the skill attributes, a second virtual object restraining other second virtual objects from the second virtual objects The conversion module 2906 is further configured to convert the first virtual object by using the selected second virtual object as a target role, to obtain the target virtual object.

In the foregoing embodiments, in a virtual environment, a user may select, from second virtual objects at a same layer, a second virtual object restraining other second virtual objects as a target role, perform role conversion on a first virtual object according to the target role, to obtain a target virtual object the same as the target role, and obtain a skill attribute the same as that of the target role. Therefore, the user may use the skill attribute restraining the other second virtual objects to attack all the second virtual objects in the virtual environment, to greatly improve an interaction effect and effectively improve a win rate of the user, thereby enhancing user experience and effectively improving the user stickiness.

In an embodiment, the first virtual object and the second virtual object belong to the character types of different camps. The role attribute includes a skill attribute. The second virtual object belongs to an enemy camp, the enemy camp further includes other enemy virtual objects appearing at different levels, and there is a restraint relationship among virtual objects at different levels in the enemy camp.

The conversion module 2906 is further configured to select, according to a restraint relationship, a virtual object restraining the second virtual object from other enemy virtual objects as a target role; and convert the first virtual object according to the target role, to obtain the target virtual object.

The assignment module 2908 is further configured assign a skill attribute the same as that of the target role and used for attacking the other enemy virtual objects to the target virtual object.

In the foregoing embodiments, in a virtual environment, a user may select, from other enemy virtual objects at different layers in an enemy camp, a virtual object restraining second virtual objects at a current layer as a target role, then perform role conversion on a first virtual object according to the target role, to obtain a target virtual object the same as the target role, and obtain a skill attribute the same as that of the target role. Therefore, the user may use the skill attribute restraining the second virtual object to attack all the second virtual objects in the virtual environment, to greatly improve an interaction effect and effectively improve a win rate of the user, thereby enhancing user experience and effectively improving the user stickiness.

In an embodiment, the first virtual object belongs to the character type. The second virtual object includes at least two candidate virtual items. The role attribute is an item attribute.

The selection module 2910 is further configured to select a virtual item from the at least two candidate virtual items.

The converting module 2906 is further configured to convert the first virtual object to a target virtual item the same as the selected virtual item.

The assignment module 2908 is further configured to assign an item attribute the same as that of the selected virtual item to the target virtual item, to hide the first virtual object.

In an embodiment, the selection module 2910 is further configured to select the virtual item from the at least two candidate virtual items according to a selection instruction input; or determine hiding coefficients of the at least two candidate virtual items in the virtual environment, and select the virtual item corresponding to a maximum hiding coefficient from the at least two candidate virtual items.

In an embodiment, the virtual environment further includes a third virtual object belonging to the character type. As shown in FIG. 30, the apparatus 2900 further includes: a finding module 2924 and a judgement module 2926.

The finding module 2924 is configured to control the third virtual object to search for the target virtual item hidden in the virtual environment.

The judgement module 2926 is configured to determine the third virtual object as a winner when the third virtual object finds the target virtual item within a preset time length; and determine the first virtual object as the winner when the third virtual object does not find the target virtual item within the preset time length.

In an embodiment, as shown in FIG. 30, the apparatus 2900 further includes a casting module 2928.

The casting module 2928 is configured to control the third virtual object to cast a cracking skill in the search for.

The conversion module 2906 is further configured to restore the target virtual item to the first virtual object when a distance between the target virtual item and the third virtual object is within a radiation range of the cracking skill.

The judgement module 2926 is further configured to determine the third virtual object as the winner when the third virtual object catches the restored first virtual object.

In an embodiment, the casting module 2928 is further configured to control the third virtual object to cast the cracking skill when the cracking skill is not in a skill cooldown.

The casting module 2928 is further configured to refuse to control the third virtual object to cast the cracking skill in case that the cracking skill is in the skill cooldown.

In an embodiment, as shown in FIG. 30, the apparatus 2900 further includes: a calculation module 2930.

The calculation module 2930 is configured to calculate a state retention time of the target virtual item when the first virtual object is converted to the target virtual item.

The conversion module 2906 is further configured to restore the target virtual item to the first virtual object when the state retention time reaches a preset time length.

In an embodiment, the assignment module 2908 is further configured to obtain a role attribute resource file having a mapping relationship with the second virtual object; and establish a mapping relationship between the target virtual object and the role attribute resource file, so that the target virtual object has the role attribute the same as that of the second virtual object and used for interaction.

In the foregoing embodiments, a user selects one virtual item from a virtual environment, then performs role conversion on a first virtual object, to obtain a target virtual item the same as the selected virtual item, and obtains an item attribute the same as that of the selected virtual item. Therefore, the user may perform hiding by using the target virtual item, so that a third virtual object is hard to find and catch the first virtual object, to improve an interaction effect and effectively improve a win rate of the user, thereby enhancing user experience and effectively improving the user stickiness.

For a specific limitation on the role conversion apparatus, refer to the limitation as in the other embodiment. The modules in the role conversion apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device 3100 is provided. The computer device 3100 may be a server, and an internal structure diagram thereof may be shown in FIG. 31. The computer device 3100 includes a processor 3102, a memory, and a communication interface 3106 that are connected by using a system bus 3112. The processor 3102 of the computer device 3100 is configured to provide computing and control capabilities. The memory of the computer device 3100 includes a non-volatile storage medium 3120 and an internal memory 3104. The non-volatile storage medium 3120 stores an operating system 3122, a computer program 3124, and a database. The internal memory 3104 provides an environment for running of the operating system 3122 and the computer program 3124 in the non-volatile storage medium 3120. The database of the computer device 3100 is configured to store role conversion data. The communication interface 3106 of the computer device 3100 is configured to communicate with an external terminal through a network connection. The computer program 3124 is executed by the processor 3102 to implement the role conversion method.

Figure 31:
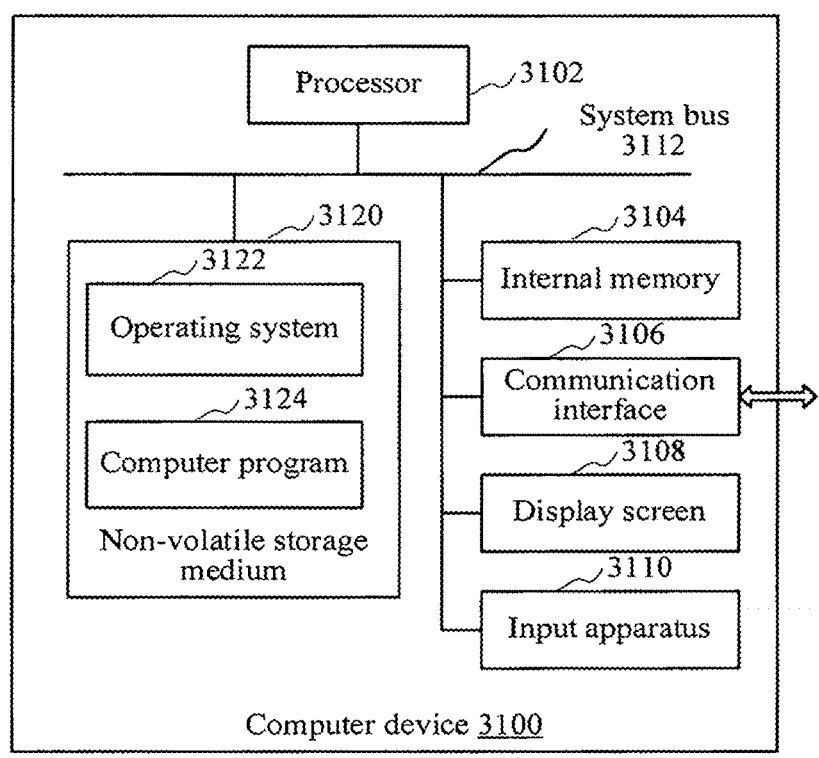
FIG. 31 is an internal structure diagram of a computer device according to an embodiment.

In an embodiment, the computer device 3100 may be a terminal, and an internal structure diagram thereof may be shown in FIG. 31. The computer device 3100 includes a processor 3102, a memory, a communication interface 3106, a display screen 3108, and an input apparatus 3110 that are connected by using a system bus 3112. The processor 3102 of the computer device 3100 is configured to provide computing and control capabilities. The memory of the computer device 3100 includes a non-volatile storage medium 3120 and an internal memory 3104. The non-volatile storage medium 3120 stores an operating system 3122 and a computer program 3124. The internal memory 3104 provides an environment for running of the operating system 3122 and the computer program 3124 in the non-volatile storage medium 3120. The communication interface 3106 of the computer device 3100 is configured to communicate with an external terminal in a wired or wireless manner, and the wireless manner may be implemented by WI-FI, a carrier network, a near field communication (NFC), or another technology. The computer program 3124 is executed by the processor to implement the role conversion method. The display screen 3108 of the computer device 3100 may be a liquid crystal display screen or an electronic ink display screen. The input apparatus 3110 of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 31 is only a block diagram of a part of a structure related to a solution of this disclosure and does not limit the computer device to which the solution of this disclosure is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the steps in the foregoing method embodiments.

In an embodiment, a computer-readable storage medium is provided, storing a computer program, the computer program, when executed by a processor, implementing the steps in the foregoing method embodiments.

A computer program product or a computer program is provided, the computer program product or the computer program including computer instructions, the computer instructions being stored in a computer-readable storage medium. The processor of the computer device reads the computer instructions from the computer-readable storage medium and executes the computer instructions, to cause the processor to perform the steps in the method embodiments.

A person of ordinary skill in the art may understand that some or all procedures in the foregoing method embodiments may be implemented by a computer program instructing related hardware. The computer program may be stored in a non-volatile computer-readable storage medium, and when the computer program is executed, the procedures of the foregoing method embodiments may be performed. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this disclosure, which are described specifically and in detail, but cannot be construed as a limitation to the patent scope of this disclosure. For a person of ordinary skill in the art, several transformations and improvements can be made without departing from the idea of this disclosure. These transformations and improvements belong to the protection scope of this disclosure. Therefore, the protection scope of the patent of this disclosure shall be subject to the appended claims.

What is claimed is:

1. A role conversion method, performed by a computer device, the method comprising:
displaying a virtual environment, a first movable virtual object and a second movable virtual object being simultaneously displayed in the virtual environment;
obtaining a role conversion instruction for the first virtual object;
converting the first virtual object to a target virtual object having a same role as the second virtual object in response to the role conversion instruction; and
assigning a role attribute the same as that of the second virtual object to the target virtual object, the role attribute comprises a skill attribute.

2. The method of claim 1, wherein the first virtual object and the second virtual object belong to character types of different camps; and the obtaining the role conversion instruction for the first virtual object comprises:
obtaining the role conversion instruction for the first virtual object in response to the first virtual object catching the second virtual object or a distance between the second virtual object and the first virtual object being less than a preset distance.

3. The method of claim 1, wherein the first virtual object is a role whose attack capability is to be strengthened, the first virtual object and the second virtual object belong to character types of different camps, and the method further comprises:
selecting a second virtual object with a strengthened attack capability from at least two second virtual objects; and
the obtaining the role conversion instruction for the first virtual object comprises:
obtaining a role conversion instruction for the first virtual object in response to the first virtual object catching the second virtual object with the strengthened attack capability or a distance between the second virtual object with the strengthened attack capability and the first virtual object being less than a preset distance.

4. The method of claim 3, wherein before the displaying the virtual environment, the method further comprises:
displaying a role selection page, at least two candidate roles being displayed in the role selection page;
receiving a selection instruction input;
selecting, according to the selection instruction input, the role whose attack capability is to be strengthened from the candidate roles; and
using the role whose attack capability is to be strengthened as the first virtual object displayed in the virtual environment.

5. The method of claim 1, wherein the first virtual object and the second virtual object belong to character types of different camps, and the method further comprises:
obtaining, in response to receiving an attack instruction, a skill value corresponding to the attack instruction and belonging to the assigned skill attribute; and
controlling the target virtual object to use the skill value to attack the second virtual object.

6. The method of claim 5, wherein after the controlling the target virtual object to use the skill value to attack the second virtual object, the method further comprises:
in response to a health point of the second virtual object reaching a restoration condition or receiving a role restoration instruction, performing role conversion on the target virtual object to restore the target virtual object to the first virtual object.

7. The method of claim 6, wherein before the performing role conversion on the target virtual object, the method further comprises:
canceling the skill attribute assigned to the target virtual object and consistent with that of the second virtual object; and
after the performing role conversion on the target virtual object, the method further comprises:
assigning an originally possessed skill attribute to the restored first virtual object.

8. The method of claim 6, wherein the performing role conversion on the target virtual object to restore the target virtual object to the first virtual object comprises:
obtaining skeleton data and corresponding costume data of the first virtual object;
generating the first virtual object according to the skeleton data and the costume data of the first virtual object; and
replacing the target virtual object with the first virtual object in the virtual environment.

9. The method of claim 8, wherein before the obtaining the role conversion instruction for the first virtual object, the method further comprises:
marking the second virtual object caught by the first virtual object or within a preset distance range; and
the converting the first virtual object to the target virtual object comprises:
converting the first virtual object to the target virtual object having the same role as the second virtual object in response to the health point of the marked second virtual object reaching a conversion condition.

10. The method of claim 9, further comprising:
displaying, in response to the health point of the marked second virtual object failing to reach the conversion condition, prompt information indicating that the role conversion fails at a picture level of the virtual environment; and
controlling the first virtual object to vibrate.

11. The method of claim 1, wherein the role attribute comprises a skill attribute, the first virtual object and the second virtual object belong to character types of different camps, and the method further comprises:
determining skill attributes possessed by the second virtual objects; and
selecting, according to the skill attributes, a second virtual object restraining other second virtual objects from the second virtual objects; and
the converting the first virtual object to the target virtual object comprises:
converting the first virtual object using the selected second virtual object as a target role, to obtain the target virtual object.

12. The method of claim 1, wherein the first virtual object and the second virtual object belong to character types of different camps, the role attribute comprises a skill attribute, the second virtual object belongs to an enemy camp, the enemy camp further comprises other enemy virtual objects appearing at different levels, and there is a restraint relationship among the virtual objects at different levels in the enemy camp, and the converting the first virtual object to the target virtual object comprises:
selecting, according to the restraint relationship, a virtual object restraining the second virtual object from the other enemy virtual objects as a target role;
converting the first virtual object according to the target role, to obtain the target virtual object; and
the assigning the role attribute the same as that of the second virtual object to the target virtual object comprises:
assigning a skill attribute the same as that of the target role and for attacking the other enemy virtual objects to the target virtual object.

13. The method of claim 1, wherein the first virtual object belongs to a character type, the second virtual object comprises at least two candidate virtual items, the role attribute is an item attribute, and the method further comprises:
selecting a virtual item from the at least two candidate virtual items; and
the converting the first virtual object to a target virtual object comprises:
converting the first virtual object to a target virtual item the same as the selected virtual item; and
the assigning the role attribute the same as that of the second virtual object to the target virtual object comprises:
assigning an item attribute the same as that of the selected virtual item to the target virtual item, to hide the first virtual object.

14. The method of claim 13, wherein the selecting the virtual item from the at least two candidate virtual items comprises:
selecting the virtual item from the at least two candidate virtual items according to a selection instruction input; or
determining hiding coefficients of the at least two candidate virtual items in the virtual environment, and selecting the virtual item corresponding to a maximum hiding coefficient from the at least two candidate virtual items.

15. The method of claim 13, wherein the virtual environment further comprises a third virtual object belonging to the character type, and the method further comprises:
controlling the third virtual object to search for a target virtual item hidden in the virtual environment;

determining the third virtual object as a winner in response to the third virtual object finding the target virtual item within a preset time length; and determining the first virtual object as a winner in response to the third virtual object failing to find the target virtual item within the preset time length.

16. The method of claim 15, further comprising:

controlling the third virtual object to cast a cracking skill in the search;

restoring the target virtual item to the first virtual object in response to a distance between the target virtual item and the third virtual object being within a radiation range of the cracking skill; and determining the third virtual object as the winner in response to the third virtual object catching the restored first virtual object.

17. The method of claim 16, wherein the controlling the third virtual object to cast the crack skill comprises:

controlling the third virtual object to cast the cracking skill in response to the cracking skill being not in a skill cooldown; and the method further comprises:

prohibiting the third virtual object from casting a cracking skill in response to the cracking skill being in the skill cooldown.

18. The method of claim 17, further comprising:

calculating a state retention time of the target virtual item in response to the first virtual object is converted to the target virtual item; and restoring the target virtual item to the first virtual object in response to the state retention time reaching a preset time length.

19. The method of claim 1, wherein the assigning the role attribute the same as that of the second virtual object to the target virtual object comprises:

obtaining a role attribute resource file having a mapping relationship with the second virtual object; and establishing a mapping relationship between the target virtual object and the role attribute resource file to enable the target virtual object to have the role attribute the same as that of the second virtual object and used for interaction.

20. The method of claim 1, wherein the assigning the role attribute the same as that of the second virtual object to the target virtual object comprises:

assigning an avatar the same as that of the second virtual object to the target virtual object; and the method further comprises:

displaying the target virtual object with the avatar to replace the first virtual object in the virtual environment.

21. The method of claim 1, further comprising:

displaying a skill attribute of the target virtual object to replace a skill attribute of the first virtual object in the virtual environment.

22. A role conversion apparatus, comprising:

a memory operable to store computer-readable instructions; and a processor circuitry operable to read the computer-readable instructions, the processor circuitry when executing the computer-readable instructions is configured to:

display a virtual environment, a first movable virtual object and a second movable virtual object being simultaneously displayed in the virtual environment;

obtain a role conversion instruction for the first virtual object;

convert the first virtual object to a target virtual object having a same role as the second virtual object in response to the role conversion instruction; and assign a role attribute the same as that of the second virtual object to the target virtual object, the role attribute comprises a skill attribute.

\* \* \* \* \*